(12) United States Patent
Sasaki et al.

(10) Patent No.: US 7,240,418 B2
(45) Date of Patent: Jul. 10, 2007

(54) METHOD OF MANUFACTURING SLIDER OF THIN-FILM MAGNETIC HEAD

(75) Inventors: Yoshitaka Sasaki, Milpitas, CA (US); Hiroyuki Itoh, Milpitas, CA (US); Takehiro Kamigama, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 159 days.

(21) Appl. No.: 11/154,636

(22) Filed: Jun. 17, 2005

(65) Prior Publication Data

US 2005/0241142 A1 Nov. 3, 2005

Related U.S. Application Data

(62) Division of application No. 09/988,343, filed on Nov. 19, 2001, now Pat. No. 6,934,124.

(51) Int. Cl.
*G11B 5/127* (2006.01)
*G11B 5/60* (2006.01)

(52) U.S. Cl. .............. 29/603.12; 29/603.01; 29/603.15; 29/603.16; 29/603.18; 29/603.27; 360/236.6

(58) Field of Classification Search .......... 29/603.12, 29/603.15, 603.16, 603.18, 603.27, 603.01; 360/236.6, 236.5, 236.8, 236.1, 236.4; 451/57, 451/37, 58, 63
See application file for complete search history.

(56) References Cited

U.S. PATENT DOCUMENTS

| 4,214,287 | A |   | 7/1980  | Stromsta et al.         |
|-----------|---|---|---------|-------------------------|
| 4,330,804 | A |   | 5/1982  | DeMoss                  |
| 4,644,641 | A |   | 2/1987  | Verdone                 |
| 5,299,079 | A |   | 3/1994  | Kuroda                  |
| 5,335,126 | A |   | 8/1994  | Tokyuama et al.         |
| 5,377,063 | A | * | 12/1994 | Taniguchi et al. ........... 360/236 |
| 5,377,064 | A | * | 12/1994 | Yaginuma et al. ....... 360/234.6 |
| 5,416,656 | A |   | 5/1995  | Fukuda et al.           |
| 5,663,853 | A |   | 9/1997  | Park                    |
| 5,835,305 | A |   | 11/1998 | Hamaguchi et al.        |
| 6,157,518 | A |   | 12/2000 | Koishi                  |
| 6,172,851 | B1| * | 1/2001  | Utsunomiya ............. 360/236.3 |
| 6,178,068 | B1|   | 1/2001  | Sugimoto                |
| 6,216,529 | B1|   | 4/2001  | Burga et al.            |
| 6,246,538 | B1| * | 6/2001  | Kasamatsu et al. ...... 360/97.01 |
| 6,282,061 | B1| * | 8/2001  | Kanda et al. ........... 360/236.5 |
| 6,359,754 | B1|   | 3/2002  | Riddering               |
| 6,470,565 | B1|   | 10/2002 | Sasaki                  |
| 6,556,380 | B2|   | 4/2003  | Bunch et al.            |

FOREIGN PATENT DOCUMENTS

JP          A-62024489          2/1987

(Continued)

*Primary Examiner*—A. Dexter Tugbang
*Assistant Examiner*—Tai Van Nguyen
(74) *Attorney, Agent, or Firm*—Oliff & Berridge, PLC

(57) ABSTRACT

A slider includes a slider main body and a thin-film magnetic head element. The slider main body has an air bearing surface, an air inflow end, and an air outflow end. The air bearing surface has a first part closer to the air outflow end, a second part closer to the air inflow end, and a border part between the first part and the second part. The second part is slanted against the first part so that the entire air bearing surface has a convex shape bent at the border part.

10 Claims, 30 Drawing Sheets

FOREIGN PATENT DOCUMENTS

| | | |
|---|---|---|
| JP | A-01-128281 | 5/1987 |
| JP | A-63-042018 | 2/1988 |
| JP | A-01091391 | 4/1989 |
| JP | A-03194779 | 8/1991 |
| JP | A-05054575 | 3/1993 |
| JP | A-06004847 | 1/1994 |
| JP | A-07-161023 | 6/1995 |
| JP | A-08045220 | 2/1996 |
| JP | A-08227513 | 9/1996 |
| JP | A-9-63027 | 3/1997 |
| JP | A-09091646 | 4/1997 |
| JP | B2-2712090 | 10/1997 |
| JP | A-10320944 | 12/1998 |
| JP | A-11-185418 | 7/1999 |
| JP | A-2000-3570 | 1/2000 |
| JP | A-2000-215429 | 8/2000 |
| JP | B2-3158487 | 2/2001 |
| JP | A-2001-250214 | 9/2001 |

* cited by examiner

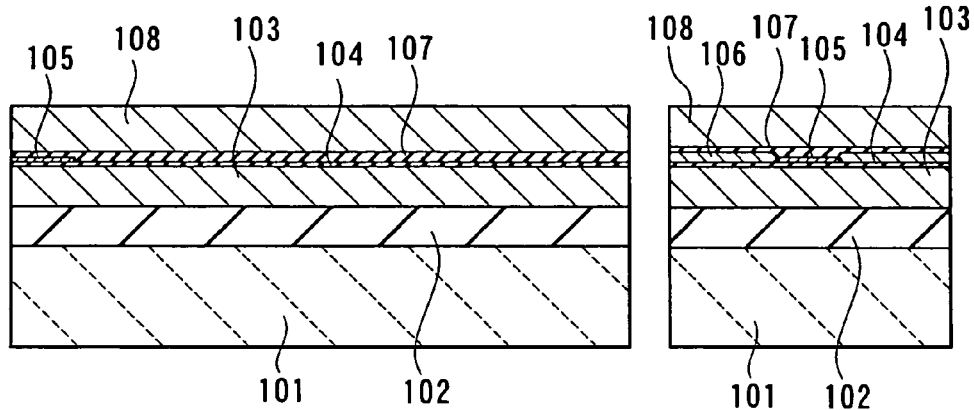
FIG. 34A
RELATED ART
FIG. 34B
RELATED ART
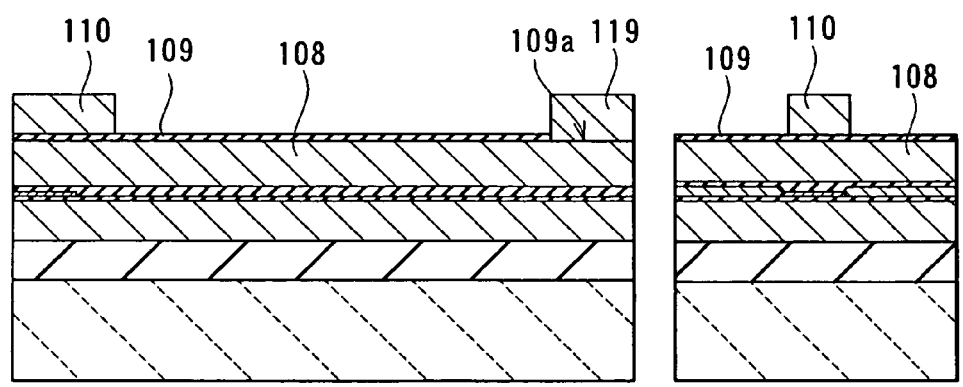
FIG. 35A
RELATED ART
FIG. 35B
RELATED ART

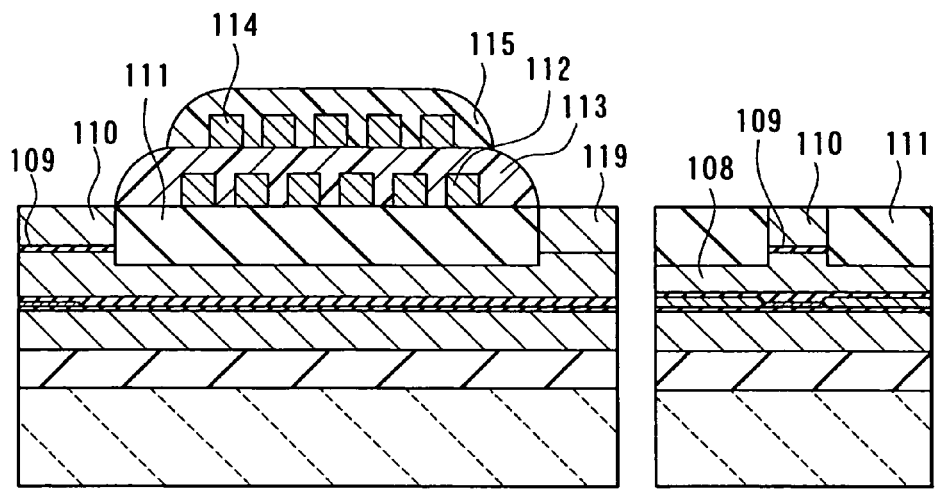
FIG. 36A
RELATED ART
FIG. 36B
RELATED ART
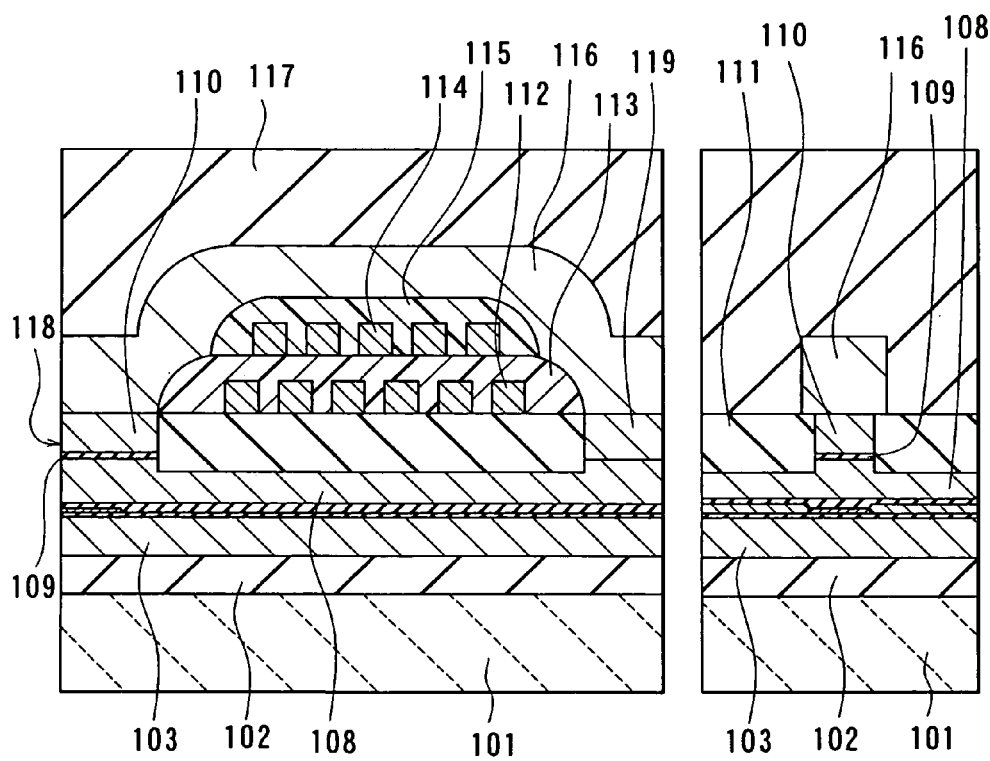
FIG. 37A
RELATED ART
FIG. 37B
RELATED ART

METHOD OF MANUFACTURING SLIDER OF THIN-FILM MAGNETIC HEAD

This is a Division of application Ser. No. 09/988,343 filed Nov. 19, 2001 now U.S. Pat. No. 6,934,124. The entire disclosure of the prior application is hereby incorporated by reference herein in its entirety.

BACKGROUND OF THE INVENTION

The present invention relates to a slider of a thin-film magnetic head which comprises a medium facing surface that faces toward a recording medium and a thin-film magnetic head element located near the medium facing surface, and to a method of manufacturing such a slider.

Performance improvements in thin-film magnetic heads have been sought as areal recording density of hard disk drives has increased. Such thin-film magnetic heads include composite thin-film magnetic heads that have been widely used. A composite head is made of a layered structure including a recording head having an induction-type electromagnetic transducer for writing and a reproducing head having a magnetoresistive element (that may be hereinafter called an MR element) for reading. MR elements include an anisotropic magnetoresistive (AMR) element that utilizes the AMR effect and a giant magnetoresistive (GMR) element that utilizes the GMR effect. A reproducing head using an AMR element is called an AMR head or simply an MR head. A reproducing head using a GMR element is called a GMR head. An AMR head is used as a reproducing head where areal recording density is more than 1 gigabit per square inch. A GMR head is used as a reproducing head where areal recording density is more than 3 gigabits per square inch. It is GMR heads that have been most widely used recently.

The performance of the reproducing head is improved by replacing the AMR film with a GMR film and the like having an excellent magnetoresistive sensitivity. Alternatively, a pattern width such as the reproducing track width and the MR height, in particular, may be optimized. The MR height is the length (height) between an end of the MR element located in the air bearing surface and the other end. The air bearing surface is a surface of the thin-film magnetic head facing toward a magnetic recording medium.

Performance improvements in a recording head are also required as the performance of a reproducing head is improved. It is required to increase the recording track density in order to increase the areal recording density among the performance characteristics of the recording head. To achieve this, it is required to implement a recording head of a narrow track structure wherein the width of top and bottom poles sandwiching the recording gap layer on a side of the air bearing surface is reduced down to microns or a submicron order. Semiconductor process techniques are utilized to implement such a structure. A pattern width, such as the throat height in particular, is also a factor that determines the recording head performance. The throat height is the length (height) of pole portions, that is, portions of magnetic pole layers facing each other with a recording gap layer in between, between the air-bearing-surface-side end and the other end. To achieve improvement in the recording head performance, it is desirable to reduce the throat height. The throat height is controlled by an amount of lapping when the air bearing surface is processed.

As thus described, it is important to fabricate well-balanced recording and reproducing heads to improve the performance of the thin-film magnetic head.

In order to implement a thin-film magnetic head that achieves high recording density, the requirements for the reproducing head include a reduction in reproducing track width, an increase in reproducing output, and a reduction in noise. The requirements for the recording head include a reduction in recording track width, an improvement in overwrite property that is a parameter indicating one of characteristics when data is written over existing data, and an improvement in nonlinear transition shift.

In general, a flying-type thin-film magnetic head used in a hard disk drive and the like is made up of a slider, a thin-film magnetic head element being formed at the trailing edge of the slider. The slider slightly flies over a recording medium by means of airflow generated by the rotation of the medium.

Reference is now made to FIG. 34A to FIG. 37A, FIG. 34B to FIG. 37B, and FIG. 38 to describe an example of a method of manufacturing a related-art thin-film magnetic head element. FIG. 34A to FIG. 37A are cross sections each orthogonal to the air bearing surface. FIG. 34B to FIG. 37B are cross sections of the pole portion each parallel to the air bearing surface.

According to the manufacturing method, as shown in FIG. 34A and FIG. 34B, an insulating layer 102 made of alumina ($Al_2O_3$), for example, is deposited to a thickness of about 5 to 10 μm on a substrate 101 made of aluminum oxide and titanium carbide ($Al_2O_3$-TiC), for example. Next, on the insulating layer 102, a bottom shield layer 103 made of a magnetic material is formed for a reproducing head.

Next, a bottom shield gap film 104 made of an insulating material such as alumina is formed to a thickness of 100 to 200 nm, for example, through a technique such as sputtering on the bottom shield layer 103. On the bottom shield gap film 104, an MR element 105 for reproduction is formed to a thickness of tens of nanometers. Next, a pair of electrode layers 106 are formed on the bottom shield gap film 104. The electrode layers 106 are electrically connected to the MR element 105.

Next, a top shield gap film 107 made of an insulating material such as alumina is formed through sputtering, for example, on the bottom shield gap film 104, the MR element 105 and the electrode layers 106. The MR element 105 is embedded in the shield gap films 104 and 107.

Next, a top shield gap film 107 made of an insulating material such as alumina is formed through sputtering, for example, on the bottom shield gap film 104, the MR element 105 and the electrode layers 106. The MR element 105 is embedded in the shield gap films 104 and 107.

Next, as shown in FIG. 35A and FIG. 35B, a recording gap layer 109 made of an insulating film such as an alumina film and having a thickness of 0.2 μm is formed on the bottom pole layer 108. Next, the recording gap layer 109 is partially etched to form a contact hole 109a for making a magnetic path. Next, a top pole tip 110 for the recording head is formed on the recording gap layer 109 in the pole portion. The top pole tip 110 is made of a magnetic material and has a thickness of 0.5 to 1.0 μm. At the same time, a magnetic layer 119 made of a magnetic material is formed for making the magnetic path in the contact hole 109a for making the magnetic path.

Next, as shown in FIG. 36A and FIG. 36B, the recording gap layer 109 and the bottom pole layer 108 are etched through ion milling, using the top pole tip 110 as a mask. As shown in FIG. 36B, the structure is called a trim structure wherein the sidewalls of the top pole portion (the top pole tip 110), the recording gap layer 109, and a part of the bottom pole layer 108 are formed vertically in a self-aligned manner.

Next, an insulating layer 111 of alumina, for example, having a thickness of about 3 μm, is formed over the entire surface. The insulating layer 111 is polished to the surfaces of the top pole tip 110 and the magnetic layer 119 and flattened.

On the flattened insulating layer 111 a first layer 112 of a thin-film coil, made of copper (Cu), for example, is formed for the induction-type recording head. Next, a photoresist layer 113 is formed into a specific shape on the insulating layer 111 and the first layer 112 of the coil. Heat treatment is performed at a specific temperature to flatten the surface of the photoresist layer 113. Next, a second layer 114 of the thin-film coil is formed on the photoresist layer 113. Next, a photoresist layer 115 is formed into a specific shape on the photoresist layer 113 and the second layer 114 of the coil. Heat treatment is performed at a specific temperature to flatten the surface of the photoresist layer 115.

Next, as shown in FIG. 37A and FIG. 37B, a top pole layer 116 for the recording head is formed on the top pole tip 110, the photoresist layers 113 and 115 and the magnetic layer 119. The top pole layer 116 is made of a magnetic material such as Permalloy (NiFe). Next, an overcoat layer 117 of alumina, for example, is formed to cover the top pole layer 116. Finally, machine processing of the slider including the forgoing layers is performed to form the air bearing surface 118 of the recording head and the reproducing head. The thin-film magnetic head element is thus completed.

FIG. 38 is a top view of the thin-film magnetic head element shown in FIG. 37A and FIG. 37B. The overcoat layer 117 and the other insulating layers and films are omitted in FIG. 38.

Reference is now made to FIG. 39 to FIG. 43 to describe the configuration and the functions of a slider of related art. FIG. 39 is a bottom view that illustrates an example of the configuration of the air bearing surface of the related-art slider. As shown, the air bearing surface of the slider 120 is shaped such that the slider 120 slightly flies over the surface of a recording medium such as a magnetic disk by means of airflow generated by the rotation of the medium. In FIG. 39 numeral 121a indicates a convex portion and numeral 121b indicates a concave portion. A thin-film magnetic head element 122 is disposed at a position near the air outflow end of the slider 120 (the upper end of FIG. 39) and near the air bearing surface of the slider 120. The configuration of the thin-film magnetic head element 122 is as shown in FIG. 37A and FIG. 37B, for example. Portion A of FIG. 39 corresponds to FIG. 37B.

The slider 120 is fabricated as follows. A wafer that includes a plurality of rows of portions to be sliders (hereinafter called slider portions), each of the slider portions including the thin-film magnetic head element 122, is cut in one direction to form blocks called bars each of which includes a row of slider portions. Each of the bars is then lapped to form the air bearing surface. Furthermore, the convex portions 121a and the concave portion 121b are formed. Each of the bars is then divided into sliders 120.

FIG. 40 is a cross section illustrating the slider 120 and a recording medium 140 in a state in which the recording medium 140 is at rest. In FIG. 40, the slider 120 is shown as sectioned along line 40-40 of FIG. 39. FIG. 41 shows the slider 120 as viewed from the upper side of FIG. 39.

As shown in FIG. 40, the greater part of the slider 120 is made up of the substrate 101 of aluminum oxide and titanium carbide, for example. The rest of the slider 120 is made up of an insulating portion 127 made of alumina, for example, and the thin-film magnetic head element 122 and so on formed in the insulating portion 127. The greater part of the insulating portion 127 is the overcoat layer 117.

In the slider 120 shown in FIG. 40 and FIG. 41, a protection layer 128, made of diamond-like carbon (DLC) or the like, is formed on the air bearing surface so as to protect the bottom shield layer 103, the bottom pole layer 108, the top pole chip 110, the top pole layer 116 and others from corrosion.

FIG. 42 is a cross section illustrating the slider 120 and the recording medium 140 in a state in which the recording medium 140 has just started rotation from a resting state. FIG. 43 shows a state in which the recording medium 140 is rotating and the slider 120 is flying over the surface of the recording medium 140 to perform reading and writing with the thin-film magnetic head element 122. While the slider 120 is flying, the minimum distance H11 between the slider 120 and the recording medium 140 is around 8 to 10 nm, and the distance H12 between the air outflow end of the slider 120 and the recording medium 140 is around 100 to 500 nm.

Methods for improving the performance characteristics of a hard disk drive, such as areal recording density, in particular, include increasing a linear recording density and increasing a track density. To design a high-performance hard disk drive, specific measures to be taken for implementing the recording head, the reproducing head or the thin-film magnetic head as a whole differ depending on whether linear recording density or track density is emphasized. That is, if priority is given to track density, a reduction in track width is required for both recording head and reproducing head, for example.

If priority is given to linear recording density, it is required for the reproducing head to improve the reproducing output and to reduce a shield gap length, that is, the distance between the bottom shield layer and the top shield layer. Moreover, it is required to reduce the distance between the recording medium and the thin-film magnetic head element (hereinafter called a magnetic space).

A reduction in magnetic space is achieved by reducing the amount of flying of the slider. A reduction in magnetic space contributes not only to an improvement in the reproducing output of the reproducing head but also to an improvement in the overwrite property of the recording head.

The following is a description of the problem that arises when the magnetic space is reduced. Conventionally, lapping of the air bearing surface of the slider 120 is performed on a rotating tin surface plate through the use of diamond slurry, for example.

A plurality of materials that make up the slider 120 have different hardnesses. For example, a comparison is made between: aluminum oxide and titanium carbide that is a ceramic material used for the substrate 101; a magnetic material such as NiFe used for the bottom shield layer 103, the bottom pole layer 108, the top pole tip 110, the top pole layer 116 and so on; and alumina used for the insulating layer 127. The hardness of aluminum oxide and titanium carbide is the greatest while that of NiFe is the smallest. The hardness of alumina is smaller than that of aluminum oxide and titanium carbide, and greater than that of NiFe.

If the slider 120 that includes a plurality of layers having different hardnesses as thus described is lapped on a tin surface plate using diamond slurry as an abrasive, differences in level may result among the layers having different hardnesses. For example, as shown in FIG. 40, a difference in level is created between the insulating portion 127 and the substrate 101, such that the insulating portion 127 is recessed relative to the substrate 101. This difference in level has a dimension R of 3 to 5 nm, for example. Although not shown, a difference of about 1 to 2 nm in level is created between the insulating portion 127 and the top pole layer 116, for example, which is a layer made up of a magnetic material such as NiFe, with the top pole layer 116 recessed relative to the insulating portion 127. Those differences in level hinder a reduction in magnetic space.

As thus described, the related-art thin-film magnetic head may have a difference in level in the air bearing surface of the slider 120, the portion corresponding to the head element 122 being recessed behind the other part. As a result, it is difficult to reduce the magnetic space, and to improve the recording density.

Since it is difficult to reduce the magnetic space of the related-art thin-film magnetic head as described above, it is impossible to improve the performance of the reproducing head in particular to a sufficient degree, such as an improvement in the reproducing output and a reduction in half width of the reproducing head. As a result, the problem of the related art is that the error rate of the hard disk devices for high density recording increases and the yield of the hard disk devices decreases.

Meanwhile, as the magnetic space is reduced, the slider is likely to collide with the recording medium, which can result in damage to the recording medium and the thin-film magnetic head element. To avoid this, it is required to enhance the smoothness of the surface of the medium. However, the slider easily sticks to the medium if the smoothness of the surface of the medium is enhanced. This results in the problem that the slider is harder to take off from the recording medium when the recording medium starts rotation from a resting state where the slider is in contact with the recording medium.

Conventionally, a crown or a camber is formed on the air bearing surface of the slider in order to prevent the slider from sticking to the recording medium. A crown refers to a convex surface which gently curves along the length of the slider 120 as shown in FIG. 40. A camber refers to a convex surface which gently curves along the width of the slider 120 as shown in FIG. 41. The crown has a difference of elevation C1 on the order of 10 to 50 nm. The camber has a difference of elevation C2 on the order of 5 to 20 nm.

Crowns are conventionally formed, for example, by changing the orientation of the bar with respect to the surface plate when lapping the air bearing surface of the bar.

Cambers are conventionally formed by the following method, for example. That is, after lapping the air bearing surface of the bar to adjust MR height, slits are made in the bar, using a diamond grinder or the like, at positions at which the slider portions are to be separated. Then, the air bearing surface of the bar is re-lapped lightly on a concave surface plate.

In the above-described method for forming cambers, after the MR height is precisely adjusted by lapping the air bearing surface of the bar, the air bearing surface of the bar is lapped again by about 10 to 20 nm in order to form the camber. This results in a problem that the MR height can deviate from its desired value. Further, in this method, when the air bearing surface of the bar is lapped on the concave surface plate, the bar can be scratched by stain and dust on the surface plate, which results in a problem of a lower yield of the thin-film magnetic heads. Further, in this method, when the air bearing surface of the bar is lapped on the concave surface plate, chippings of the electrode layer connected to the MR element may be jammed and spread between the air bearing surface and the surface plate, producing a defect called a smear. The smear sometimes causes an electric short circuit between the MR element and the shield layers. The short circuit can lower the sensitivity of the reproducing head and produce noise in the reproducing output, thereby deteriorating the performance of the reproducing head.

Further, if crowns/cambers are to be formed on the air bearing surfaces of the sliders, the costs for manufacturing the sliders can be raised because of the steps of forming the crowns/cambers.

OBJECT AND SUMMARY OF THE INVENTION

An object of the present invention is to provide a slider of a thin-film magnetic head and a method of manufacturing the same, capable of reducing the magnetic space while preventing damage to a recording medium or a thin-film magnetic head element due to a collision between the slider and the recording medium, and preventing the slider from sticking to the recording medium.

A slider of a thin-film magnetic head according to the invention comprises:

a slider main body having: a medium facing surface that faces toward a rotating recording medium; an air inflow end; and an air outflow end; and a thin-film magnetic head element disposed near the air outflow end and near the medium facing surface of the slider main body, wherein:

the medium facing surface has: a first part closer to the air outflow end; a second part closer to the air inflow end; and a border part between the first part and the second part, the second part being slanted against the first part so that the entire medium facing surface has a convex shape bent at the border part.

According to the slider of a thin-film magnetic head of the invention, the entire medium facing surface has a convex shape bent at the border part. When the slider main body comes into contact with the surface of the recording medium, the border part makes contact with the surface of the recording medium.

In the slider of a thin-film magnetic head of the invention, while the recording medium is rotating, the second part may slant against a surface of the recording medium so that the air inflow end gets farther from the recording medium than the border part does. In this case, the second part and the surface of the recording medium may form an angle of no greater than 30° while the recording medium is rotating.

In the slider of a thin-film magnetic head of the invention, the slider main body may be in contact with a surface of the recording medium while the recording medium is at rest, and may stay away from the surface of the recording medium while the recording medium is rotating. In this case, when the slider main body comes into contact with the surface of the recording medium, the border part may be the first to make contact with the surface of the recording medium. On the other hand, when the slider main body takes off from the surface of the recording medium, the border part may be the last to depart from the surface of the recording medium.

In the slider of a thin-film magnetic head of the invention, the medium facing surface may have a concavity/convexity for controlling orientation of the slider main body during the rotation of the recording medium.

In the slider of a thin-film magnetic head of the invention, regardless of whether the recording medium is rotating or at rest, the slider main body may be in contact with the surface of the recording medium at the border part, and the first part and the second part may slant against the surface of the recording medium so that the air outflow end and the air inflow end are off the recording medium.

In the slider of a thin-film magnetic head of the invention, the first part and the second part may form an angle of no greater than 30°.

In the slider of a thin-film magnetic head of the invention, the medium facing surface may have a recess formed in a region including the border part.

In the slider of a thin-film magnetic head of the invention, the slider main body may include: a substrate portion that has a surface facing toward the recording medium and makes a base of the thin-film magnetic head element; and an insulating portion that has a surface facing toward the recording medium and surrounds the thin-film magnetic head element. In this case, the medium facing surface may have a recess formed in a region including the border part, and the recess may be formed in the substrate portion.

In the slider of a thin-film magnetic head of the invention, when the slider main body includes the substrate portion and the insulating portion, the slider main body may further include a protection layer that covers the surfaces of the substrate portion and the insulating portion facing toward the recording medium. In this case, the medium facing surface may have a recess formed in a region including the border part, and the recess may be formed in the protection layer. The protection layer may be made of alumina or diamond-like carbon.

In the slider of a thin-film magnetic head of the invention, when the slider main body includes the substrate portion and the insulating portion, the surface of the insulating portion facing toward the recording medium may be located farther from the recording medium than a part of the surface of the substrate portion facing toward the recording medium is, the part being adjacent to the surface of the insulating portion facing toward the recording medium. In this case, the slider main body may be in contact with a surface of the recording medium regardless of whether the recording medium is rotating or at rest, and a portion of the first part, the portion belonging to the substrate portion, may be in contact with the surface of the recording medium at least while the recording medium is rotating.

In the slider of a thin-film magnetic head of the invention, when the slider main body includes the substrate portion and the insulating portion, the length of a portion of the first part in the direction of air passage, the portion belonging to the substrate portion, may be equal to or less than 50% the length of the entire substrate portion in the direction of air passage.

A method of the invention is provided for manufacturing a slider of a thin-film magnetic head, the slider comprising: a slider main body having a medium facing surface that faces toward a rotating recording medium, an air inflow end, and an air outflow end; and a thin-film magnetic head element disposed near the air outflow end and near the medium facing surface of the slider main body, wherein: the medium facing surface has: a first part closer to the air outflow end; a second part closer to the air inflow end; and a border part between the first part and the second part, the second part being slanted against the first part so that the entire medium facing surface has a convex shape bent at the border part.

The method of manufacturing the slider comprises the steps of:

forming a slider material containing a portion to be the slider main body and the thin-film magnetic head element, and processing the slider material so as to form the medium facing surface having the first part, the second part and the border part, and the air inflow end and the air outflow end on the slider material.

According to the slider of a thin-film magnetic head manufactured by the method of the invention, the entire medium facing surface has a convex shape bent at the border and, when the slider main body comes into contact with the surface of the recording medium, the border part makes contact with the surface of the recording medium.

In the method of manufacturing a slider of the invention, the step of processing the slider material may include the steps of: lapping the slider material to form the first part; and lapping the slider material to form the second part.

In the method of manufacturing a slider of the invention, the step of processing the slider material may include the step of forming, on the medium facing surface, a concavity/convexity for controlling orientation of the slider main body during the rotation of the recording medium.

In the method of manufacturing a slider of the invention, the first part and the second part may form an angle of no greater than 30°.

In the method of manufacturing a slider of the invention, the step of processing the slider material may include the step of forming a recess in the medium facing surface at a region including the border part.

In the method of manufacturing a slider of the invention, the portion to be the slider main body may include: a substrate portion that has a surface facing toward the recording medium and makes a base of the thin-film magnetic head element; and an insulating portion that has a surface facing toward the recording medium and surrounds the thin-film magnetic head element. In this case, the step of processing the slider material may include the step of forming a recess in the medium facing surface at a region including the border part by etching the substrate portion.

In the method of manufacturing a slider of the invention, when the portion to be the slider main body includes the substrate portion and the insulating portion, the step of processing the slider material may include the step of forming a protection layer for covering the surfaces of the substrate portion and the insulating portion facing toward the recording medium. The step of processing the slider material may also include the step of forming a recess in the medium facing surface at a region including the border part by etching the protection layer. The protection layer may be made of alumina or diamond-like carbon.

In the method of manufacturing a slider of the invention, when the portion to be the slider main body includes the substrate portion and the insulating portion, the surface of the insulating portion facing toward the recording medium may be located farther from the recording medium than a part of the surface of the substrate portion facing toward the recording medium is, the part being adjacent to the surface of the insulating portion facing toward the recording medium. The length of a portion of the first part in the direction of air passage, the portion belonging to the substrate portion, may be equal to or less than 50% the length of the entire substrate portion in the direction of air passage.

Other and further objects, features and advantages of the invention will appear more fully from the following description.

BRIEF DESCRIPTION OF THE DRAWINGS

FIG. 34A and FIG. 34B are cross sections for illustrating a step of a method of manufacturing a related-art thin-film magnetic head element.

FIG. 35A and FIG. 35B are cross sections for illustrating a step that follows FIG. 34A and FIG. 34B.

FIG. 36A and FIG. 36B are cross sections for illustrating a step that follows FIG. 35A and FIG. 35B.

FIG. 37A and FIG. 37B are cross sections of the related-art thin-film magnetic head element.

DETAILED DESCRIPTION OF THE PREFERRED EMBODIMENTS

Preferred embodiments of the invention will now be described in detail with reference to the accompanying drawings.

Figure 1:
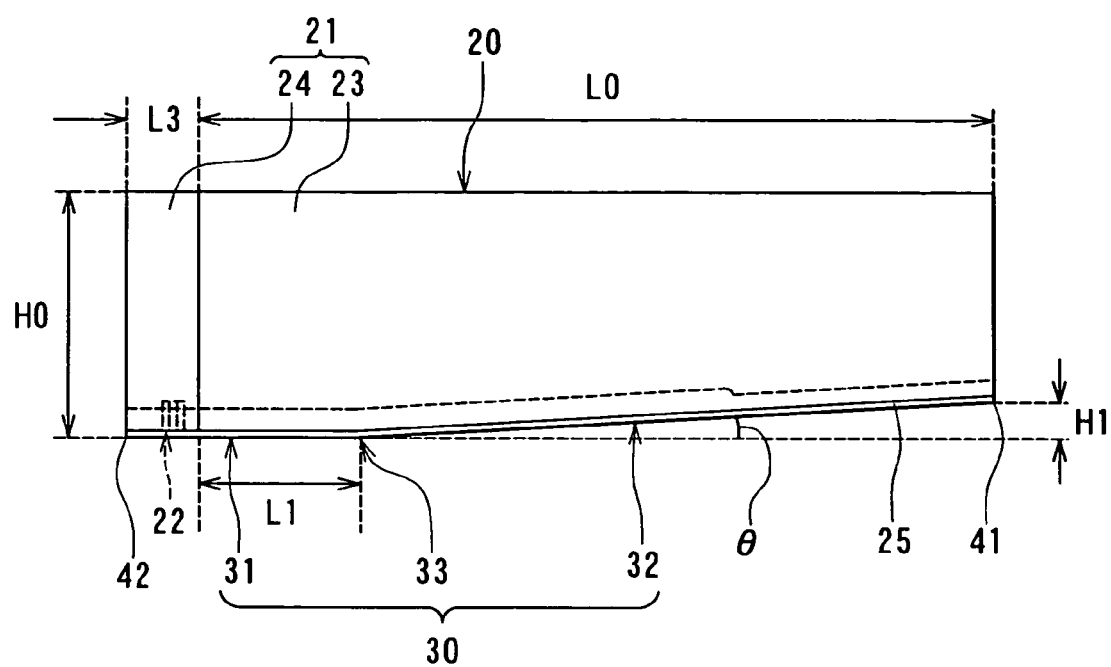
FIG. 1 is a side view of a slider according to a first embodiment of the invention.
Figure 2:
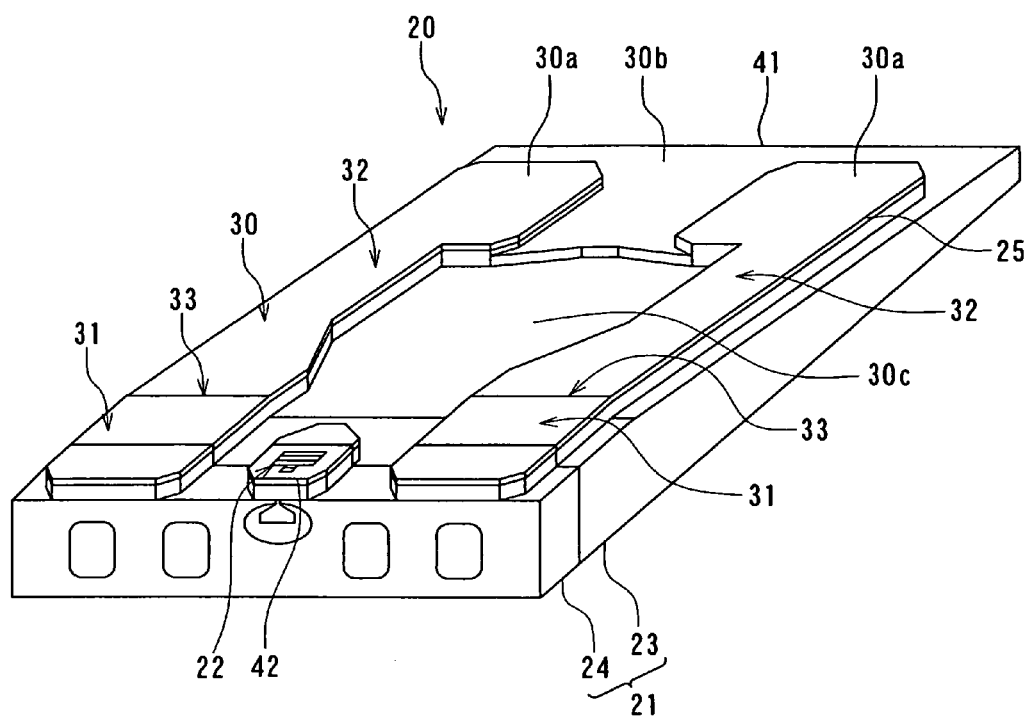
FIG. 2 is a perspective view of the slider according to the first embodiment of the invention.

Reference is now made to FIG. 1 and FIG. 2 to describe a configuration of a slider of a thin-film magnetic head (hereinafter simply referred to as a slider) according to a first embodiment of the invention. FIG. 1 is a side view of the slider according to the embodiment. FIG. 2 is a perspective view of the slider according to the embodiment.

The slider 20 of the embodiment comprises a slider main body 21 and a thin-film magnetic head element 22. The slider main body 21 has: an air bearing surface 30, an air inflow end 41, and an air outflow end 42. The air bearing surface 30 serves as a medium facing surface that faces toward a rotating recording medium. The air inflow end 41 is an end from which an airflow created by the rotation of the recording medium flows in. The air outflow end 42 is an end from which this airflow flows out. The thin-film magnetic head element 22 is disposed near the air outflow end 42 and near the air bearing surface 30 of the slider main body 21.

The air bearing surface 30 has first parts 31 closer to the air outflow end 42, second parts 32 closer to the air inflow end 41, and border parts 33 each located between the first and second parts 31 and 32. The first parts 31 lie in parallel to the surface of the slider main body 21 opposite to the air bearing surface 30. The second parts 32 are slanted against the first parts 31 so that the entire air bearing surface 30 has a convex shape (roof shape) bent at the border parts 33. A first part 31 and a second part 32 preferably form an angle θ of no greater than 30°.

The slider main body 21 includes: a substrate portion 23 that has a surface facing toward the recording medium (the surface on the lower side of FIG. 1) and makes a base of the thin-film magnetic head element 22; and an insulating portion 24 that has a surface facing toward the recording medium (the surface on the lower side of FIG. 1) and surrounds the thin-film magnetic head element 22. The slider main body 21 further includes a protection layer 25 that covers the surfaces of the substrate portion 23 and the insulating portion 24 facing toward the recording medium. The substrate portion 23 is made of aluminum oxide and titanium carbide, for example. The insulating portion 24 is made chiefly of alumina, for example. The protection layer 25 is made of alumina or diamond-like carbon, for example.

As shown in FIG. 2, the air bearing surface 30 has concavities and convexities for controlling the orientation of the slider main body 21 during the rotation of the recording medium. Specifically, the air bearing surface 30 includes surfaces 30a that are closest to the recording medium, a surface 30b having a first difference in level with respect to these surfaces 30a, and a surface 30c having a second difference in level, greater than the first difference in level, with respect to the surfaces 30a. The surfaces 30a are disposed near both sides along the width of the slider main body 21 (the lateral direction in FIG. 2). The surface 30b is disposed near the air inflow end 41. The surface 30c corresponds to the entire air bearing surface 30 excluding the surfaces 30a and 30b.

The slider 20 of the embodiment can give the slider main body 21 a force in a direction away from the recording medium or a force toward the recording medium by means of airflow according to the shape of the concavities/convexities of the air bearing surface 30. Therefore, it is possible to control the orientation of the slider main body 21 over the rotating recording medium through designing the shape of the concavities/convexities of the air bearing surface 30.

As shown in FIG. 1, each first part 31 of the air bearing surface 30 is arranged across the substrate portion 23 and the insulating portion 24. The length L1 of a portion of the first part 31 in the direction of air passage (the lateral direction in FIG. 1), the portion belonging to the substrate portion 23, is preferably equal to or less than 50% the length L0 of the entire substrate portion 23 in the direction of air passage.

The length L0 of the entire substrate portion 23 in the direction of air passage is 1.2 mm, for example. Meanwhile, the length L3 of the insulating portion 24 in the direction of air passage is about 30 to 40 μm. Therefore, the length of the slider main body 21 in the direction of air passage is approximately equal to the length L0 of the entire substrate portion 23 in the direction of air passage.

At the air outflow end 42, the slider main body 21 has a height (vertical length in FIG. 1) H0 of 0.3 mm, for example. The protection layer 25 has a thickness of approximately 3 to 5 nm, for example.

Here, as shown in FIG. 1, the distance between the air inflow end 41 and a virtual plane containing the first part 31 of the air bearing surface 30 will be referred to as a difference of elevation and represented by a symbol H1. The difference of elevation H1 is determined by the lengths L0, L1 and the angle θ. The following provides examples of the relationship among the length L1, the angle θ, and the difference of elevation H1 where the length L0 is 1.2 mm.

When the length L1 is 10 μm, angles θ of 0.5°, 1°, 10°, and 30° yield differences of elevation H1 of 10.39 μm, 20.77 μm, 209.83 μm, and 687.05 μm, respectively.

When the length L1 is 50 μm, angles θ of 0.5°, 1°, 10°, and 30° yield differences of elevation H1 of 10.04 μm, 20.07 μm, 202.78 μm, and 663.95 μm, respectively.

When the length L1 is 100 μm, angles θ of 0.5°, 1°, 10°, and 30° yield differences of elevation H1 of 9.60 μm, 19.20 μm, 193.96 μm, and 635.09 μm, respectively.

Reference is now made to FIG. 3A to FIG. 8A, FIG. 3B to FIG. 8B, and FIG. 9 to describe an example of a method of manufacturing the thin-film magnetic head element 22 of the slider according to the present embodiment. FIG. 3A to FIG. 8A are cross sections each orthogonal to the air bearing surface and the top surface of the substrate. FIG. 3B to FIG. 8B are cross sections of magnetic pole portion parallel to the air bearing surface.

Figures 3A, 3B:
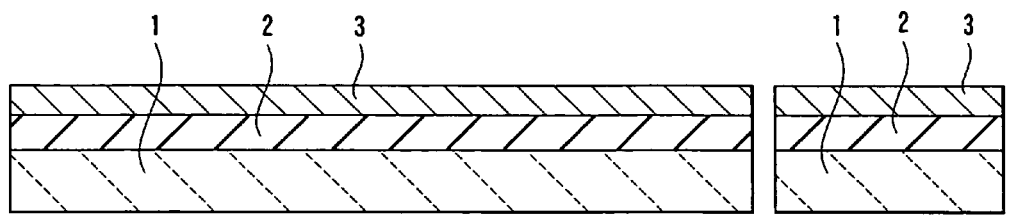
FIG. 3A and FIG. 3B are cross sections for illustrating a step in an example of a method of manufacturing a thin-film magnetic head element.

In the method of manufacturing the thin-film magnetic head element 22 of this example, as shown in FIG. 3A and FIG. 3B, an insulating layer 2 made of alumina ($Al_2O_3$), for example, of about 5 μm in thickness is deposited on a substrate 1 made of aluminum oxide and titanium carbide ($Al_2O_3$-TiC), for example. Next, on the insulating layer 2, a bottom shield layer 3, made of a magnetic material such as Permalloy and having a thickness of about 3 μm, is formed for the reproducing head. The bottom shield layer 3 is selectively formed on the insulating layer 2 through plating with a photoresist film as a mask, for example. Next, although not shown, an insulating layer of alumina, for example, is formed to a thickness of 4 to 5 μm, for example, over the entire surface. The insulating layer is then polished through chemical mechanical polishing (CMP), for example, so that the bottom shield layer 3 is exposed, and the surface is flattened.

Figures 4A, 4B:
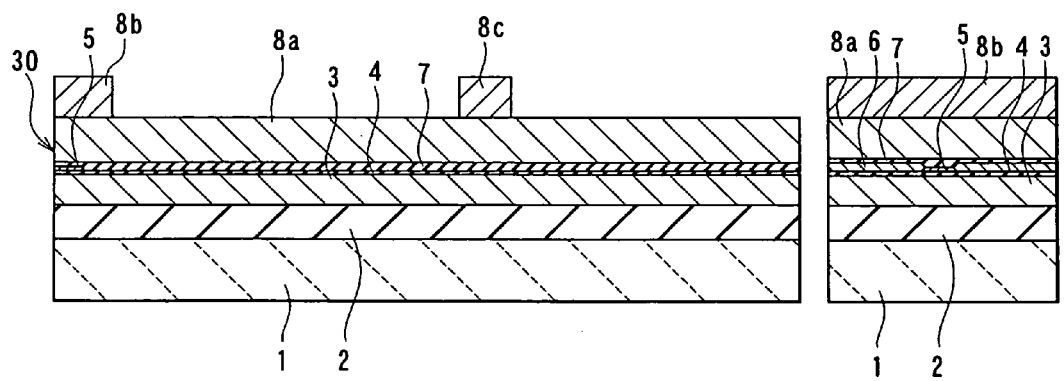
FIG. 4A and FIG. 4B are cross sections for illustrating a step that follows FIG. 3A and FIG. 3B.

Next, as shown in FIG. 4A and FIG. 4B, on the bottom shield layer 3, a bottom shield gap film 4 as an insulating film is formed to a thickness of about 20 to 40 nm, for example. Next, an MR element 5 for magnetic signal detection is formed to a thickness of tens of nanometers on the bottom shield gap film 4. One of ends of the MR element 5 is disposed in the air bearing surface 30. The MR element 5 may be formed through selectively etching an MR film formed through sputtering. The MR element 5 may be an element utilizing a magnetosensitive film that exhibits magnetoresistivity, such as an AMR element, a GMR element or a tunnel magnetoresistive (TMR) element. Next, a pair of electrode layers 6 having a thickness of tens of nanometers are formed on the bottom shield gap film 4. The electrode layers 6 are electrically connected to the MR element 5. Next, a top shield gap film 7 having a thickness of about 20 to 40 nm, for example, is formed as an insulating film on the bottom shield gap film 4 and the MR element 5. The MR element 5 is embedded in the shield gap films 4 and 7. The insulating material to be used for the shield gap films 4 and 7 may be alumina, aluminum nitride, or diamond-like carbon (DLC). The shield gap films 4 and 7 may be formed through sputtering or chemical vapor deposition (CVD).

Next, a first layer 8a of a top-shield-layer-cum-bottom-pole layer (hereinafter called a bottom pole layer) 8 is selectively formed to a thickness of about 1.0 to 1.5 μm on the top shield gap film 7. The bottom pole layer 8 is made of a magnetic material and used for both reproducing head and recording head. The bottom pole layer 8 is made up of the first layer 8a, and a second layer 8b and a third layer 8c described later. The first layer 8a of the bottom pole layer 8 is disposed to face at least part of a thin-film coil described later.

Next, the second layer 8b and the third layer 8c of the bottom pole layer 8, each having a thickness of about 1.5 to 2.5 µm, are formed on the first layer 8a. The second layer 8b includes a magnetic pole portion of the bottom pole layer 8 and is connected to a surface of the first layer 8a that faces toward a recording gap layer described later (on the upper side of FIG. 4A and FIG. 4B). The third layer 8c is provided for connecting the first layer 8a to a top pole layer described later, and is disposed near the center of the thin-film coil described later. A portion of the second layer 8b facing the top pole layer has an end located farther from the air bearing surface 30, and the position of this end defines the throat height.

The second layer 8b and the third layer 8c of the bottom pole layer 8 may be made of NiFe (80 weight % Ni and 20 weight % Fe), or NiFe (45 weight % Ni and 55 weight % Fe) as a high saturation flux density material and formed through plating, or may be made of a material such as FeN or FeZrN as a high saturation flux density material through sputtering. Alternatively, a material such as CoFe or a Co-base amorphous material as a high saturation flux density material may be used.

Figures 5A, 5B:
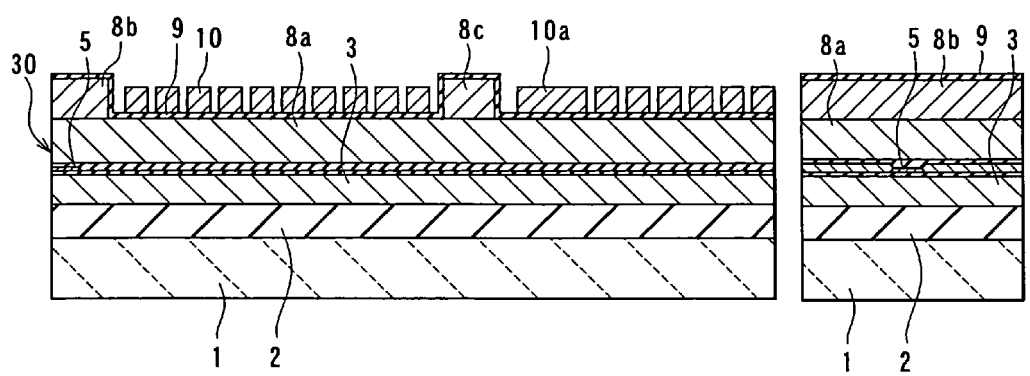
FIG. 5A and FIG. 5B are cross sections for illustrating a step that follows FIG. 4A and FIG. 4B.

Next, as shown in FIG. 5A and FIG. 5B, an insulating film 9 having a thickness of about 0.3 to 0.6 µm is formed over the entire surface.

Next, a photoresist is patterned through a photolithography process to form a frame (not shown) used for making the thin-film coil through frame plating. Next, the thin-film coil 10 made of copper (Cu), for example, is formed by frame plating through the use of the frame. For example, the thickness of the coil 10 is about 1.0 to 2.0 µm and the pitch is 1.2 to 2.0 µm. The frame is then removed. In the drawings numeral 10a indicates a portion for connecting the coil 10 to a conductive layer (lead) described later.

Figures 6A, 6B:
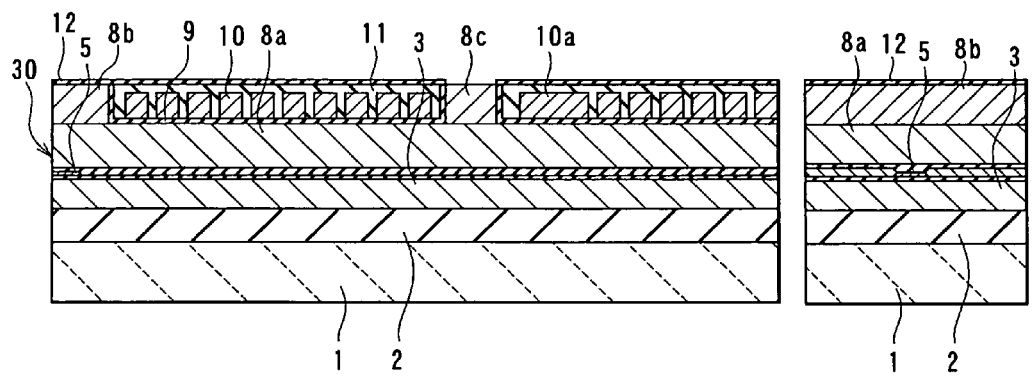
FIG. 6A and FIG. 6B are cross sections for illustrating a step that follows FIG. 5A and FIG. 5B.

Next, as shown in FIG. 6A and FIG. 6B, an insulating layer 11 of alumina, for example, having a thickness of about 3 to 4 µm, is formed over the entire surface. The insulating layer 11 is then polished through CMP, for example, until the second layer 8b and the third layer 8c of the bottom pole layer 8 are exposed, and the surface is flattened. Although the coil 10 is not exposed in FIG. 6A, the coil 10 may be exposed.

Next, a recording gap layer 12 made of an insulating material is formed to a thickness of 0.2 to 0.3 µm, for example, on the second layer 8b and the third layer 8c of the bottom pole layer 8 exposed and the insulating layer 11. In general, the insulating material used for the recording gap layer 12 may be alumina, aluminum nitride, a silicon-dioxide-base material, a silicon-nitride-base material, or diamond-like carbon (DLC) and so on. The recording gap layer 12 may be fabricated through sputtering or CVD.

Next, a portion of the recording gap layer 12 located on top of the third layer 8c of the bottom pole layer 8 is etched to form a contact hole for making the magnetic path. Portions of the recording gap layer 12 and the insulating layer 11 that are located on top of the connecting portion 10a of the coil 10 are etched to form a contact hole.

Figures 7A, 7B:
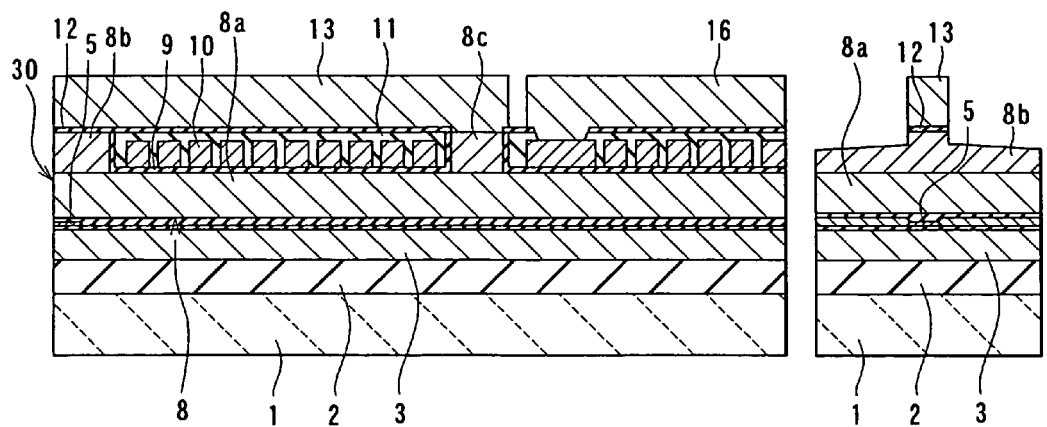
FIG. 7A and FIG. 7B are cross sections for illustrating a step that follows FIG. 6A and FIG. 6B.

Next, as shown in FIG. 7A and FIG. 7B, on the recording gap layer 12, a top pole layer 13 having a thickness of about 2.0 to 3.0 µm is formed in a region extending from the air bearing surface 30 to a portion on top of the third layer 8c of the bottom pole layer 8. At the same time, a conductive layer 16 having a thickness of about 2.0 to 3.0 µm is formed to be connected to the portion 10a of the thin-film coil 10. The top pole layer 13 is in contact with the third layer 8c of the bottom pole layer 8 and magnetically coupled thereto through the contact hole formed in the portion on top of the third layer 8c.

The top pole layer 13 may be made of NiFe (80 weight % Ni and 20 weight % Fe) or a high saturation flux density material such as NiFe (45 weight % Ni and 55 weight % Fe) through plating, or may be made of a material such as FeN or FeZrN as a high saturation flux density material through sputtering. Alternatively, a material such as CoFe or a Co-base amorphous material as a high saturation flux density material may be used. To improve the high frequency characteristic, the top pole layer 13 may be made of a number of layers of inorganic insulating films and magnetic layers of Permalloy, for example.

Next, the recording gap layer 12 is selectively etched through dry etching, using the top pole layer 13 as a mask. The dry etching may be reactive ion etching (RIE) using a chlorine-base gas such as $BCl_2$ or $Cl_2$, or a fluorine-base gas such as $CF_4$ or $SF_6$, for example. Next, the second layer 8b of the bottom pole layer 8 is selectively etched by about 0.3 to 0.6 µm through argon ion milling, for example. A trim structure as shown in FIG. 7B is thus formed. The trim structure suppresses an increase in the effective track width due to expansion of a magnetic flux generated during writing in a narrow track.

Figures 8A, 8B:
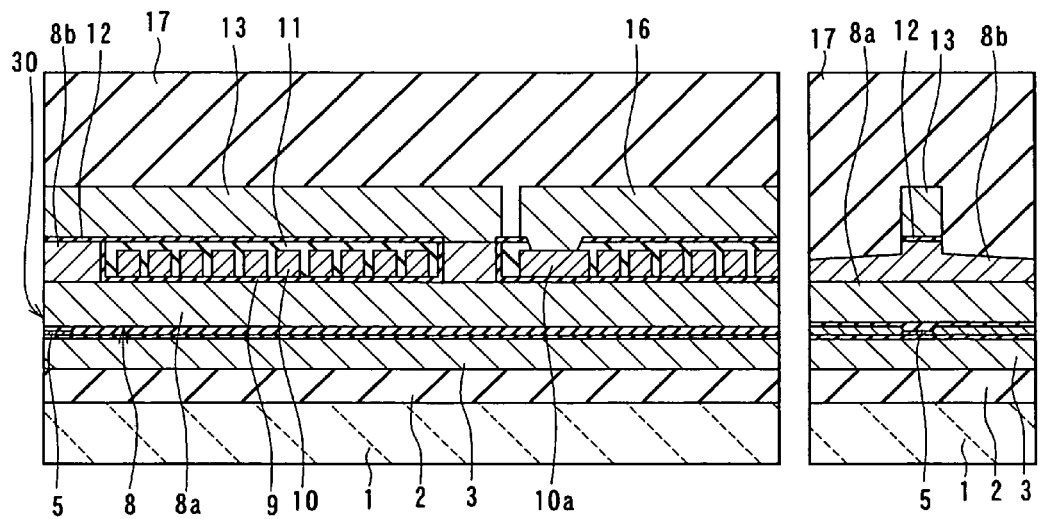
FIG. 8A and FIG. 8B are cross sections for illustrating a configuration of an example of the thin-film magnetic head element.

Next, as shown in FIG. 8A and FIG. 8B, an overcoat layer 17 of alumina, for example, having a thickness of 20 to 40 µm is formed over the entire surface. The surface of the overcoat layer 17 is then flattened and pads (not shown) for electrodes are formed on the overcoat layer 17. Finally, lapping of the slider including the foregoing layers is performed to form the air bearing surface 30 of the recording head and the reproducing head. The thin-film magnetic head element is thus completed.

Figure 9:
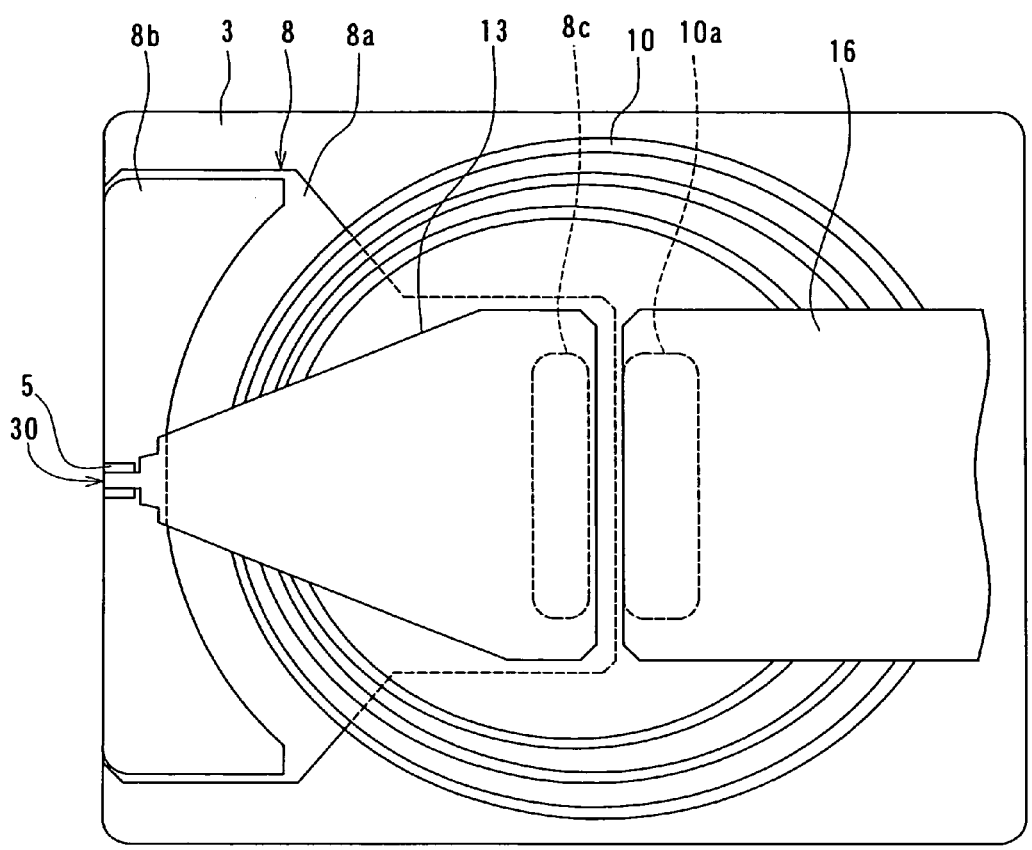
FIG. 9 is a top view of the main part of the thin-film magnetic head element shown in FIG. 8A and FIG. 8B.

FIG. 9 is a top view illustrating the main part of the thin-film magnetic head element shown in FIG. 8A and FIG. 8B, wherein the overcoat layer 17 and the other insulating layers and films are omitted.

The thin-film magnetic head element of this example comprises the reproducing head and the recording head (induction-type electromagnetic transducer). The reproducing head includes the MR element 5 for magnetic signal detection, and the bottom shield layer 3 and the top shield layer (bottom pole layer 8) for shielding the MR element 5. Portions of the bottom shield layer 3 and the top shield layer on a side of the medium facing surface that faces toward a recording medium, i.e., air bearing surface 30, are opposed to each other while the MR element 5 is placed between these portions of the bottom shield layer 3 and the top shield layer.

The recording head includes the bottom pole layer 8 and the top pole layer 13 magnetically coupled to each other, each of which includes at least one layer. The bottom pole layer 8 and the top pole layer 13 include magnetic pole portions opposed to each other and located in regions on a side of the air bearing surface 30. The recording head further includes: the recording gap layer 12 provided between the magnetic pole portion of the bottom pole layer 8 and the magnetic pole portion of the top pole layer 13; and the thin-film coil 10 at least part of which is disposed between the bottom pole layer 8 and the top pole layer 13 and is insulated from the bottom and top pole layers 8 and 13.

The substrate portion 23 of the slider main body 21 shown in FIG. 1 and FIG. 2 is composed of the substrate 1 of FIG.

8A and FIG. 8B. The insulating portion 24 of the slider main body 21 is composed mostly of the overcoat layer 17.

Next, the outline of a method of manufacturing a slider according to the present embodiment is described. In the method of manufacturing a slider according to the present embodiment, a wafer that includes a plurality of rows of portions (hereinafter called slider portions) to be sliders 20 is cut in one direction to form blocks called bars each of which includes a row of slider portions. Each slider portion includes the thin-film magnetic head element 22 and a portion to be the slider main body 21. Each bar corresponds to the slider material in the present invention.

Next, the air bearing surfaces 30 each having the first parts 31, the second parts 32 and the border parts 33 are formed on the bar, along with the air inflow ends 41 and the air outflow ends 42. The first parts 31, the second parts 32, and the border parts 33 are formed, for example, by lapping the bar twice using a lapping apparatus, while changing orientation of the bar with respect to the surface plate. In this case, the bar is initially lapped while detecting the resistance values of the MR elements 5 in a plurality of the slider portions included in the bar so as to make the slider portions equal in MR height and in throat height, to thereby form surfaces including the first parts 31 on the bar. Next, the bar is lapped with its orientation changed with respect to the surface plate to form the second parts 32 and the border parts 33.

Subsequently, the surfaces 30a, 30b, and 30c are formed in the air bearing surfaces 30 by etching, for example. Finally, the bar is cut between adjacent ones of slider portions to separate it into individual sliders 20.

Figure 10:
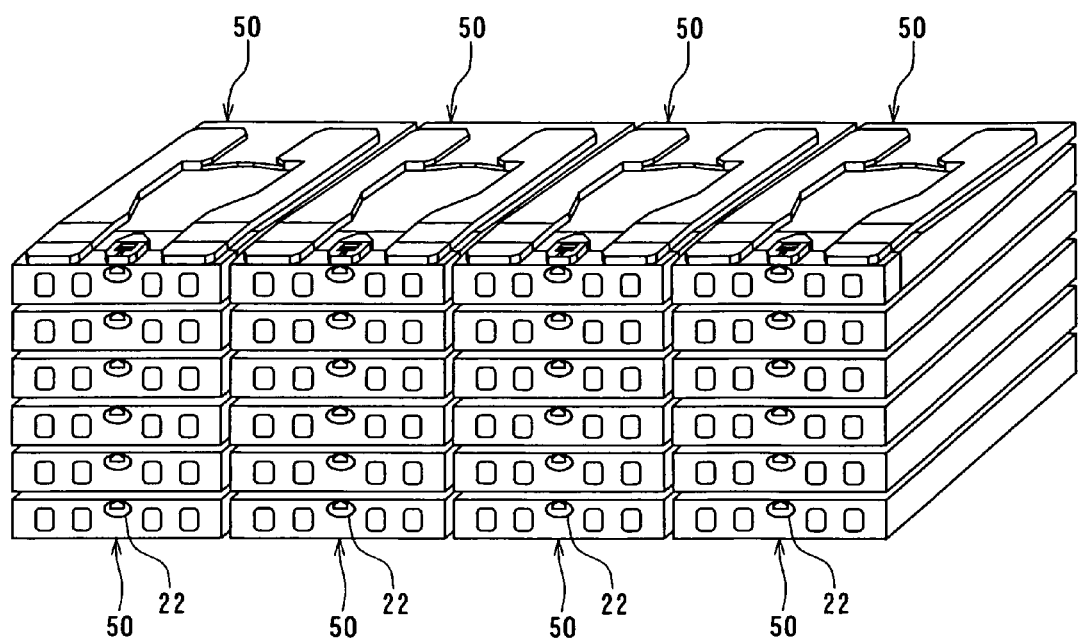
FIG. 10 is a perspective view showing an array of slider portions on a wafer to be used in a method of manufacturing the slider according to the first embodiment of the invention.

FIG. 10 is a perspective view showing an array of slider portions on a wafer. In FIG. 10, the reference numeral 50 represents each slider portion. Each bar includes a plurality of slider portions 50 aligning in a row in the lateral direction of FIG. 10. For easy understanding, FIG. 10 shows the topmost slider portions 50 as having their air bearing surfaces formed already.

Figure 11:
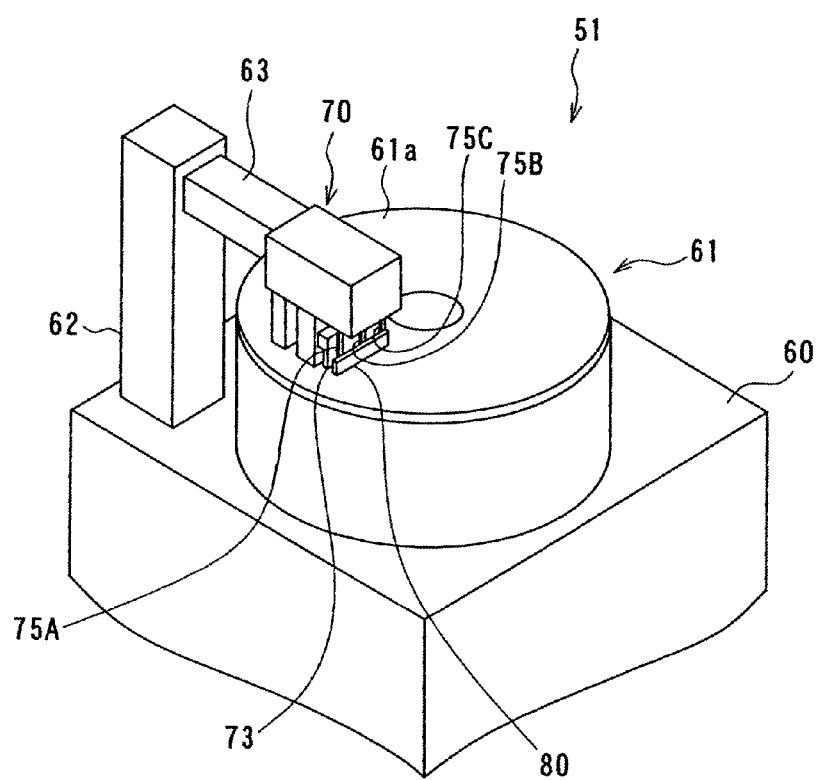
FIG. 11 is a perspective view showing a schematic configuration of a lapping apparatus for lapping a bar in the first embodiment of the invention.
Figure 12:
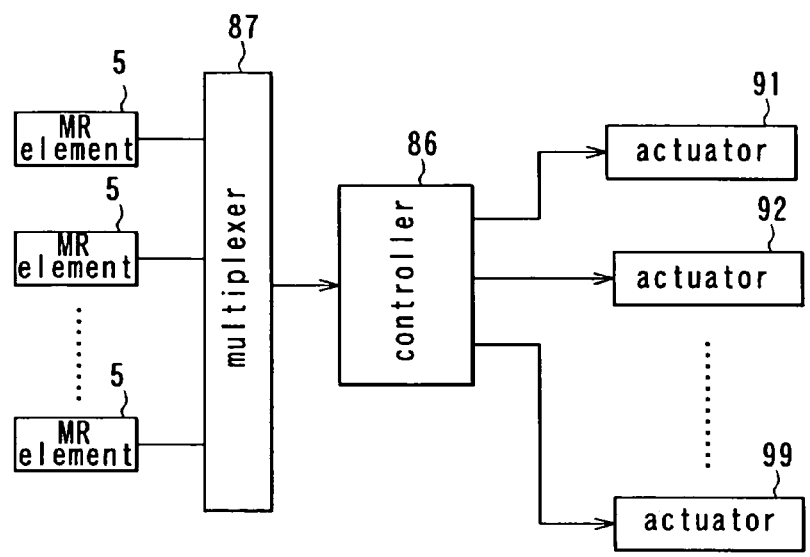
FIG. 12 is a block diagram showing an example of a circuit configuration of the lapping apparatus shown in FIG. 11.

With reference to FIG. 11 and FIG. 12, description will now be given of an example of the method of lapping the bar while detecting the resistance values of the MR elements 5 in the plurality of slider portions 50 included in the bar so as to make the slider portions 50 equal in MR height and in throat height.

FIG. 11 is a perspective view illustrating a schematic configuration of a lapping apparatus for lapping the bar. This lapping apparatus 51 comprises: a table 60; a rotating lapping table 61 provided on the table 60; a strut 62 provided on the table 60 by the side of the rotating lapping table 61; and a material supporter 70 attached to the strut 62 through an arm 63. The rotating lapping table 61 has a lapping plate 61a to come to contact with the bar.

The material supporter 70 comprises a jig retainer 73 and three load application rods 75A, 75B and 75C placed in front of the jig retainer 73 with specific spacing. A jig 80 is to be fixed to the jig retainer 73. The jig 80 has three load application sections each of which is in the shape of a hole having an oblong cross section. Load application pins are provided at the lower ends of the load application rods 75A, 75B and 75C, respectively. Each of the load application pins has a head to be inserted to each of the load application sections (holes), the head having an oblong cross section. Each of the load application pins is driven by an actuator (not shown) in the vertical, horizontal (along the length of the jig 80) and rotational directions.

The jig 80 has a retainer for retaining a bar. With this jig 80, the retainer and the bar are deformed by applying loads in various directions to the three load application sections. The air bearing surface 30 of the bar is thereby lapped while the throat heights and MR heights of the thin-film magnetic head elements 22 in the bar are controlled so that the target values are obtained.

FIG. 12 is a block diagram showing an example of the circuit configuration of the lapping apparatus shown in FIG. 11. This lapping apparatus comprises: nine actuators 91 to 99 for applying loads in the three directions to the load application sections of the jig 80; a controller 86 for controlling the nine actuators 91 to 99 through monitoring the resistance values of a plurality of MR elements 5 in the bar; and a multiplexer 87, connected to the MR elements 5 in the bar through a connector (not shown), for selectively connecting one of the MR elements 5 to the controller 86.

In this lapping apparatus, the controller 86 monitors the resistance values of the MR elements 5 in the bar through the multiplexer 87, and controls the actuators 91 to 99 so that throat height and MR height of every thin-film magnetic head element 22 fall within a certain limited tolerance.

Next, with reference to FIG. 13 to FIG. 17, description will be given in detail of the method of manufacturing a slider according to the embodiment. Each of FIG. 13 to FIG. 17 is a side view of a slider portion 50. The slider portion 50 includes the substrate portion 23, the insulating portion 24, and the thin-film magnetic head element 22.

Figure 13:
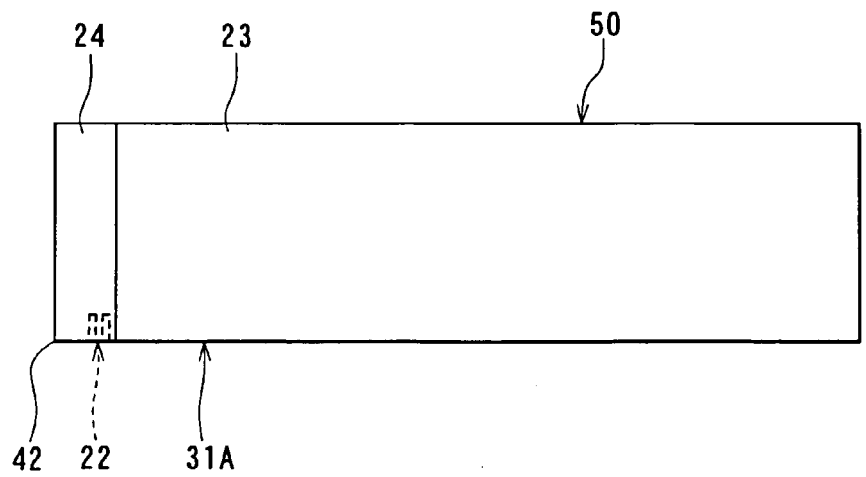
FIG. 13 is a side view showing a step in the method of manufacturing the slider according to the first embodiment of the invention.

In the method of manufacturing a slider of the embodiment, as shown in FIG. 13, the bar is initially lapped while detecting the resistance values of the MR elements 5 in a plurality of the slider portions 50 included in the bar so as to make every slider portion 50 equal in MR height and in throat height, and a surface 31A including the first part 31 of the air bearing surface 30 is thereby formed for each slider portion 50. At this point, the air outflow end 42 is formed for each slider portion 50.

Figure 14:
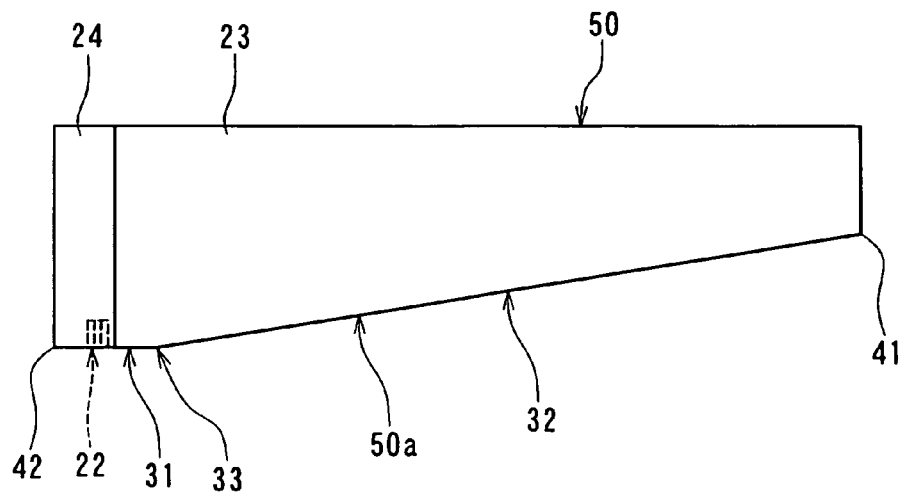
FIG. 14 is a side view for illustrating a step that follows FIG. 13.

Next, as shown in FIG. 14, the bar is lapped with its orientation changed with respect to the surface plate to form the second part 32 and the border part 33 of the air bearing surface 30. The surface 31A left unlapped here makes the first part 31. At this point, the air inflow end 41 is formed for each slider portion 50. At this point, a surface 50a that includes the surface 30a closest to the recording medium is formed for each slider portion 50.

Figure 15:
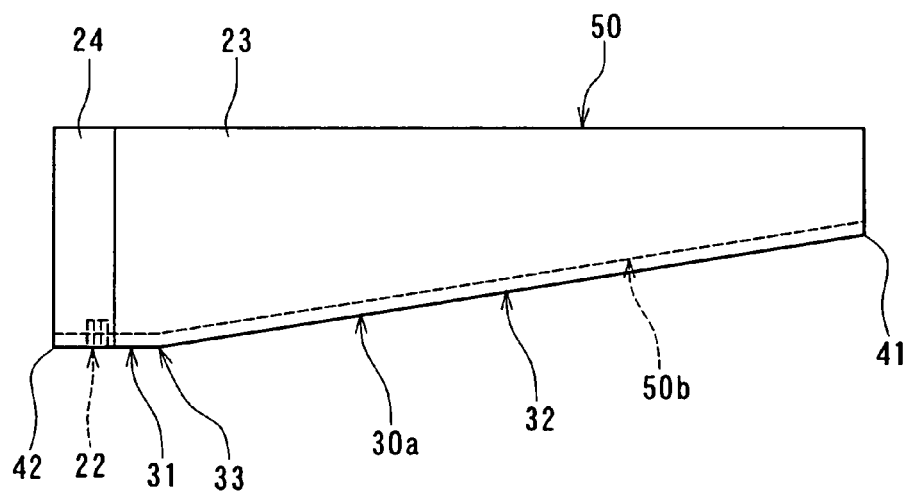
FIG. 15 is a side view for illustrating a step that follows FIG. 14.

Then, as shown in FIG. 15, the surface 50a of the slider portion 50 is selectively etched to form a surface 50b that includes the surface 30b. The surface 50a left unetched here makes the surfaces 30a. The depth of the surface 50b from the surfaces 30a is approximately 1 μm, for example.

Figure 16:
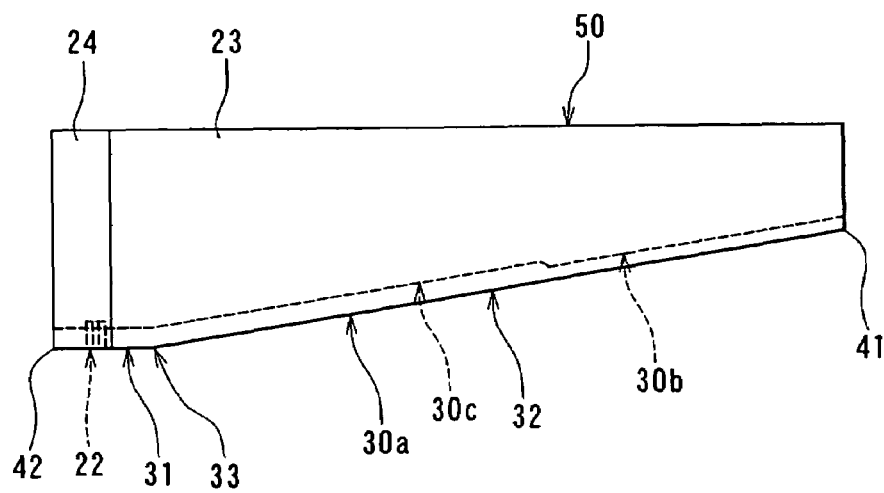
FIG. 16 is a side view for illustrating a step that follows FIG. 15.

Next, as shown in FIG. 16, the surface 50b of the slider portion 50 is selectively etched to form the surface 30c. The surface 50b left unetched here makes the surface 30b. The depth of the surface 30c from the surfaces 30a is approximately 2-3 μm, for example.

The etching of the surfaces 50a and 50b of the slider portion 50 is effected, for example, by reactive ion etching (RIE) using a chlorine-base gas such as $BCl_2$ or $Cl_2$, or a fluorine-base gas such as $CF_4$ or $SF_6$, for example.

Figure 17:
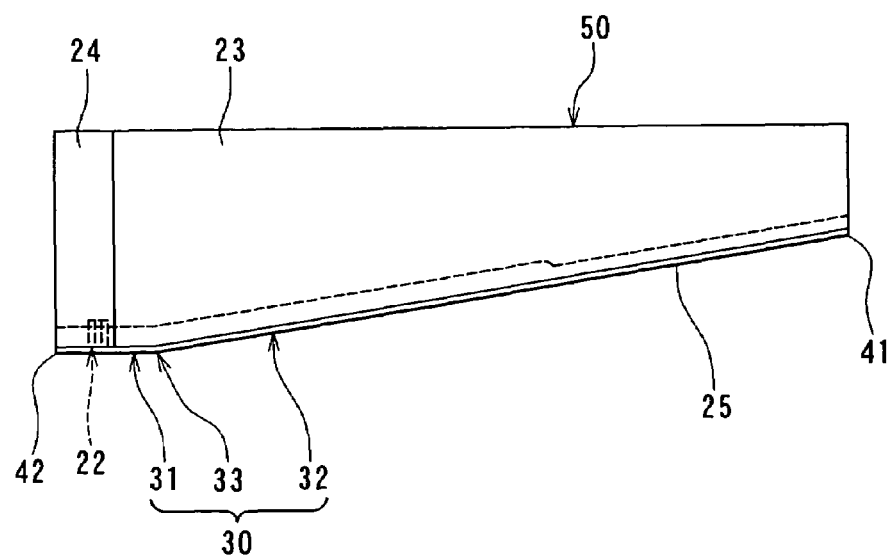
FIG. 17 is a side view for illustrating a step that follows FIG. 16.

Then, as shown in FIG. 17, the protection layer 25 is formed to cover the surfaces of the substrate portion 23 and the insulating portion 24 facing toward the recording medium. The protection layer 25 is made of alumina or diamond-like carbon, for example. The protection layer 25 has a thickness of about 3 to 5 nm, for example. Subsequently, the bar is cut between adjacent ones of slider portions 50 to separate the bar into individual sliders 20.

Concurrently with the formation of the surface 30b or the surface 30c for the slider portion 50, edges of the air outflow end 42 may be chamfered.

Figure 18:
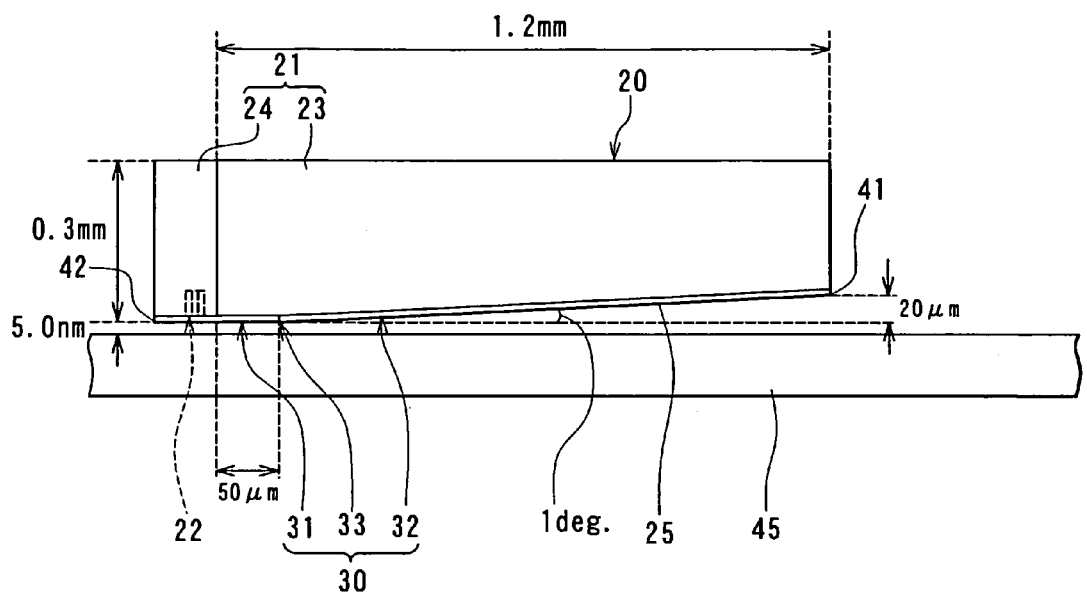
FIG. 18 is a side view showing an example of the shape of the slider according to the first embodiment of the invention.

FIG. 18 shows an example of the shape of the slider 20. In this example, the length L0 of the entire substrate portion 23 in the direction of air passage is 1.2 mm. The height H0 of the slider main body 21 at the air outflow end 42 is 0.3 mm. The length L1 of a portion of the first part 31 in the direction of air passage, the portion belonging to the substrate portion 23, is 50 μm. The angle θ formed between the first part 31 and the second part 32 is 1°. The difference of elevation H1 is 20 μm.

The slider 20 shown in FIG. 18 was mounted on a suspension to be described later and was allowed to fly over a rotating recording medium 45. In this case, the distance between the first part 31 and the recording medium 45 was about 5.0 nm.

Figure 19:
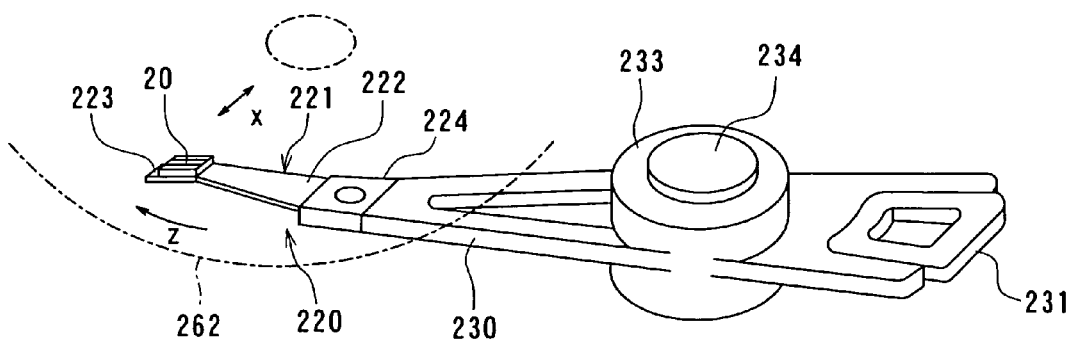
FIG. 19 is a perspective view of a head gimbal assembly incorporating the slider according to the first embodiment of the invention.
Figure 20:
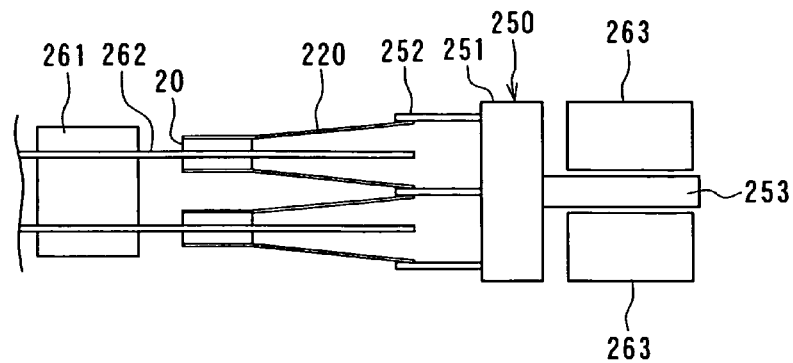
FIG. 20 is an explanatory view showing the main part of a hard disk drive in which the slider according to the first embodiment of the invention is used.
Figure 21:
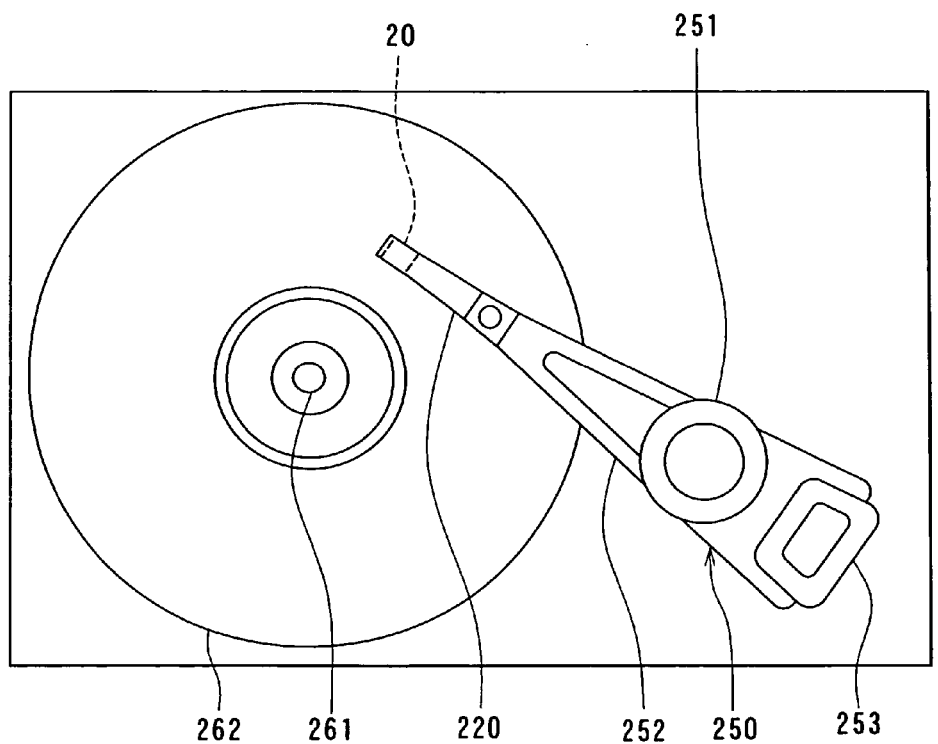
FIG. 21 is a top view of the hard disk drive in which the slider according to the first embodiment of the invention is used.

Reference is now made to FIG. 19 to FIG. 21 to describe a head gimbal assembly and a hard disk drive incorporating the slider 20 of the present embodiment. Now, reference is made to FIG. 19 to describe the head gimbal assembly 220. In a hard disk drive, the slider 20 is disposed to face toward a hard disk 262 which is a circular-plate-shaped recording medium that is rotated and driven. The head gimbal assembly 220 comprises the slider 20 and a suspension 221 that flexibly supports the slider 20. The suspension 221 incorporates: a plate-spring-shaped load beam 222 made of stainless steel, for example; a flexure 223 to which the slider 20 is joined, the flexure being provided at an end of the load beam 222 and giving an appropriate degree of freedom to the slider 20; and a base plate 224 provided at the other end of the load beam 222. The base plate 224 is attached to an arm 230 of an actuator that moves the slider 20 along the x direction across the track of the hard disk 262. The actuator incorporates the arm 230 and a voice coil motor that drives the arm 230. A gimbal section that maintains the orientation of the slider 20 is provided in the portion of the flexure 223 on which the slider 20 is mounted.

The head gimbal assembly 220 is attached to the arm 230 of the actuator. The head gimbal assembly 220 attached to the single arm 230 is called a head arm assembly. A plurality of head gimbal assemblies 220 each attached to a plurality of arms of a carriage are called a head stack assembly.

FIG. 19 illustrates an example of the head arm assembly. In the head arm assembly the head gimbal assembly 220 is attached to an end of the arm 230. A coil 231 that is part of the voice coil motor is fixed to the other end of the arm 230. A bearing 233 is provided in the middle of the arm 230. The bearing 233 is attached to an axis 234 that rotatably supports the arm 230.

Reference is now made to FIG. 20 and FIG. 21 to describe an example of the head stack assembly and the hard disk drive. FIG. 20 is an explanatory view illustrating the main part of the hard disk drive. FIG. 21 is a top view of the hard disk drive. The head stack assembly 250 incorporates a carriage 251 having a plurality of arms 252. A plurality of head gimbal assemblies 220 are each attached to the arms 252 such that the assemblies 220 are arranged in the vertical direction with spacing between adjacent ones. A coil 253 that is part of the voice coil motor is mounted on the carriage 251 on a side opposite to the arms 252. The head stack assembly 250 is installed in the hard disk drive. The hard disk drive includes a plurality of hard disk platters 262 mounted on a spindle motor 261. Two of the sliders 20 are allocated to each of the platters 262, such that the two sliders 20 face each other with each of the platters 262 in between. The voice coil motor includes permanent magnets 263 located to face each other, the coil 253 of the head stack assembly 250 being placed between the magnets 263.

The head stack assembly 250 except the slider 20 and the actuator support the slider 20 and align it with respect to the hard disk platter 262.

In this hard disk drive, the actuator moves the slider 20 across the track of the platter 262 and aligns the slider 20 with respect to the platter 262. The thin-film magnetic head incorporated in the slider 20 writes data on the platter 262 through the use of the recording head and reads data stored on the platter 262 through the use of the reproducing head.

Figure 22:
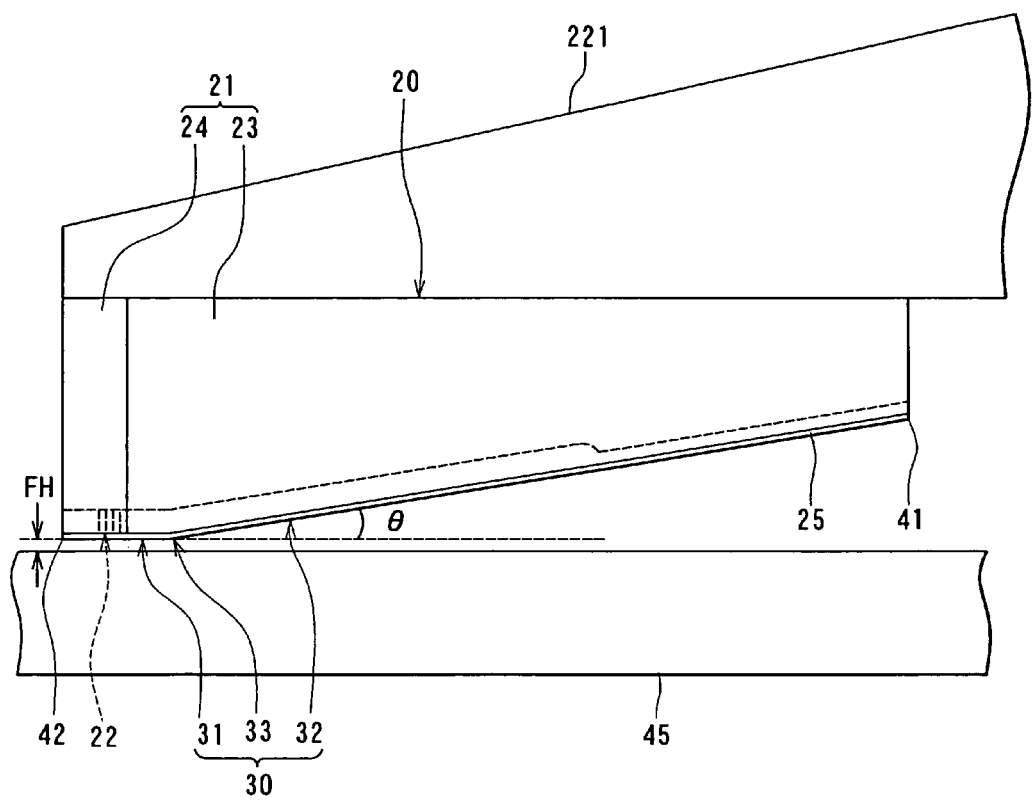
FIG. 22 is a side view showing a state of the slider according to the first embodiment of the invention when the recording medium is rotating.
Figure 23:
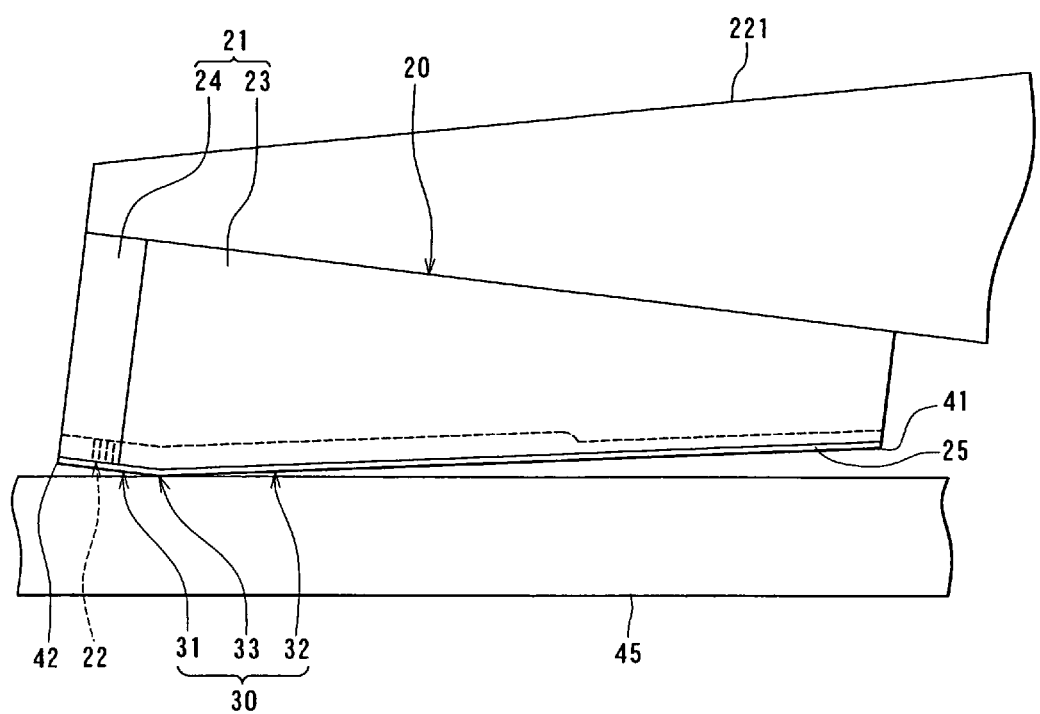
FIG. 23 is a side view showing a state of the slider according to the first embodiment of the invention when the recording medium is at rest.

Reference is now made to FIG. 22 and FIG. 23 to describe the functions and effects of the slider 20 according to the embodiment. FIG. 22 is a side view showing a state of the slider 20 when the recording medium 45 is rotating. FIG. 23 is a side view showing a state of the slider 20 when the recording medium 45 is at rest.

As shown in FIG. 22, while the recording medium 45 is rotating, the slider main body 21 flies by means of the airflow created by the rotation of the recording medium 45 and is off the surface of the recording medium 45. On the other hand, as shown in FIG. 23, the slider main body 21 is in contact with the surface of the recording medium 45 while the recording medium 45 is at rest.

As shown in FIG. 22, while the recording medium 45 is rotating, the second parts 32 of the air bearing surface 30 slant against the surface of the recording medium 45 so that the air inflow end 41 gets farther from the recording medium 45 than the border parts 33 do. While the recording medium 45 is rotating, the first parts 31 of the air bearing surface 30 become almost parallel to the surface of the recording medium 45. While the recording medium 45 is rotating, each second part 32 preferably forms an angle no greater than 30° with respect to the surface of the recording medium 45. During the rotation of the recording medium 45, when the first parts 31 of the air bearing surface 30 become parallel to the surface of the recording medium 45, each second part 32 and the surface of the recording medium 45 form an angle equal to the angle θ that is formed between the first and second parts 31 and 32. Here, the distance FH from the first parts 31 to the surface of the recording medium 45 is about 5 nm. Such orientation of the slider main body 21 during the rotation of the recording medium 45 can be controlled by means of the shape of the concavities/convexities on the air bearing surface 30.

When the recording medium 45 shifts from the rotating state to the resting state and the slider main body 21 comes into contact with the surface of the recording medium 45, the border parts 33 are the first to make contact with the surface of the recording medium 45. When the recording medium 45 shifts from the resting state to the rotating state and the slider main body 21 takes off from the surface of the recording medium 45, the border parts 33 are the last to depart from the surface of the recording medium 45. Thus, the border parts 33 function as if a wheel of an aircraft does.

As described above, the slider 20 of the embodiment makes contact with the surface of the recording medium 45 at the border parts 33 of the slider main body 21. Therefore, as compared with conventional sliders, the area in which the slider main body 21 contacts the surface of the recording medium 45 is extremely smaller, yielding an extreme reduction in the frictional resistance between the slider main body 21 and the surface of the recording medium 45. Therefore, according to the slider 20 of the embodiment, the initial contact of the slider main body 21 with the surface of the recording medium 45 and the separation of the slider main body 21 from the surface of the recording medium 45 can be performed smoothly. As a result, the embodiment makes it possible to prevent occurrence of damage to the recording medium 45 and the thin-film magnetic head element 22 due to a collision between the slider 20 and the recording medium 45.

According to the slider 20 of the embodiment, the area in which the slider main body 21 is in contact with the surface of the recording medium 45 when the recording medium 45 is at rest is extremely smaller than in conventional sliders. Therefore, it is possible to prevent the slider 20 and the recording medium 45 from sticking to each other.

According to the slider 20 of the embodiment, as shown in FIG. 22, during the rotation of the recording medium 45, each second part 32 of the air bearing surface 30 slants against the surface of the recording medium 45 so that the air inflow end 41 gets farther from the recording medium 45 than the border parts 33 do. As a result, the thin-film magnetic head element 22 approaches the surface of the recording medium 45. Thus, according to the slider 20 of the embodiment, during the rotation of the recording medium 45, the thin-film magnetic head element 22 can be placed close to the surface of the recording medium 45 while the second parts 32 of the air bearing surface 30 are kept farther from the recording medium 45 than the thin-film magnetic head element 22 is. Therefore, the embodiment makes it possible to further reduce the magnetic space while avoiding the collision between the slider 20 and the recording medium 45.

If the edges of the air outflow end 42 are chamfered, it is possible to prevent a collision between the slider 20 and the recording medium 45 with higher reliability.

As has been described, according to the slider 20 of the embodiment, it is possible to reduce the magnetic space while preventing damage to the recording medium 45 and the thin-film magnetic head element 22 due to a collision between the slider 20 and the recording medium 45, and preventing the slider 20 the recording medium 45 from sticking to each other.

Figure 24:
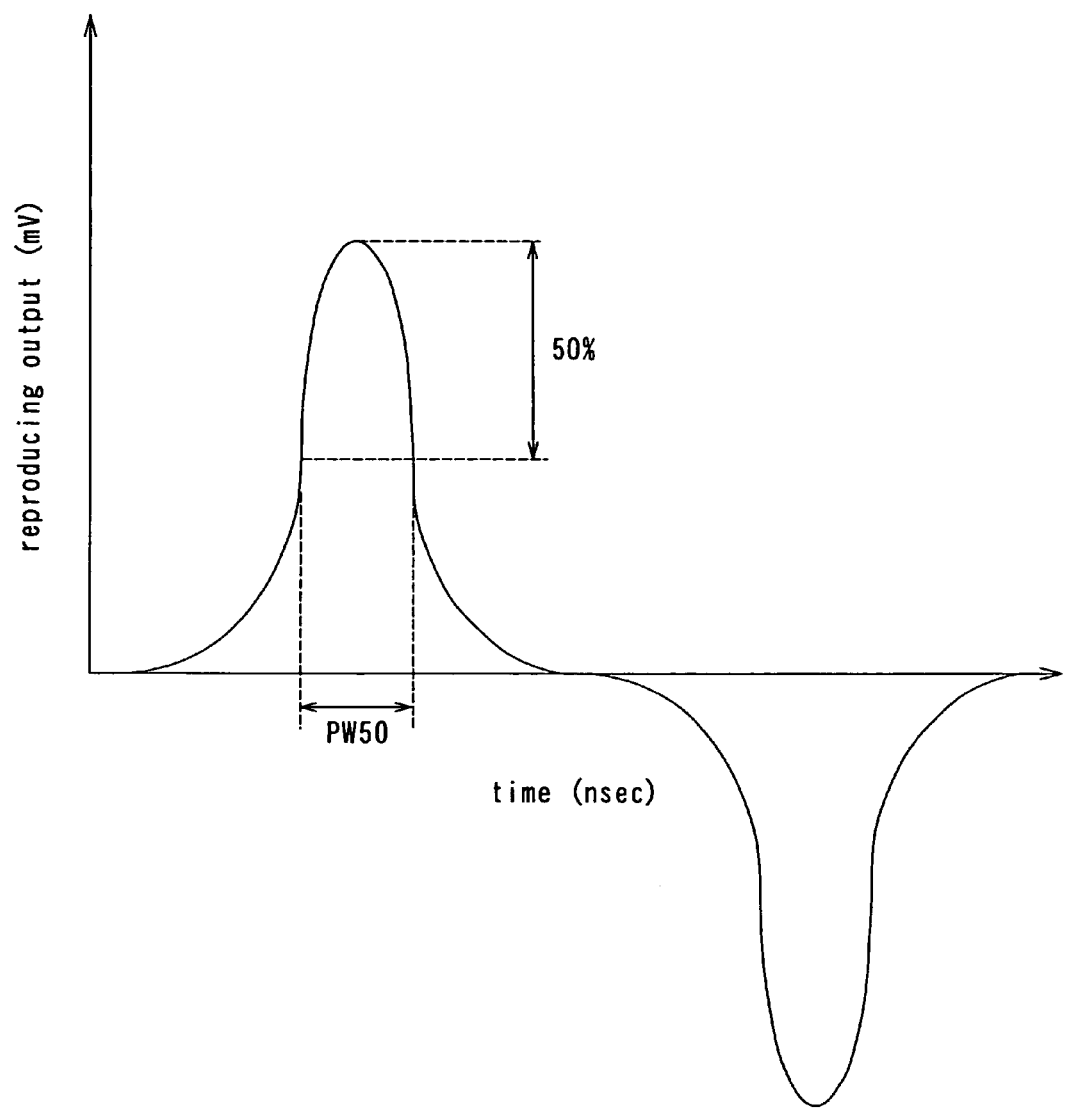
FIG. 24 is a plot for illustrating an example of the waveform of reproducing output of the thin-film magnetic head element of the slider according to the first embodiment of the invention.

Since the present embodiment allows a reduction in magnetic space, it is possible to improve the reproducing output of the reproducing head of the thin-film magnetic head element 22 and to reduce half width of the reproducing head. As a result, it is possible to improve the recording density. FIG. 24 shows an example of the waveform of reproducing output of the thin-film magnetic head element 22 of the slider 20 of the embodiment. In FIG. 24 'PW50' indicates the half width of the reproducing output. The half width PW50 is the time required for the reproducing output to reach 50 percent or greater of the peak value. Since the present embodiment allows a reduction in magnetic space, it is also possible to improve the overwrite property and nonlinear transition shift of the recording head of the thin-film magnetic head element 22.

Therefore, according to the embodiment, the thin-film magnetic head element 22 can be improved in the characteristics of both the reproducing head and the recording head. As a result, it is possible to improve the yield of hard disk drives that implement the slider 20 of the embodiment.

In the embodiment, the air bearing surface 30 of the slider 20 can be formed easier than in the cases where crowns or cambers are formed on the air bearing surfaces of sliders. Besides, there will occur no problem associated with the crown/camber formation. Thus, according to the embodiment, as compared to the cases where crowns or cambers are formed on the air bearing surfaces of sliders, it is possible to determine the shape of the air bearing surface 30 precisely, improve the yield of the slider 20, and reduce the costs for manufacturing the slider 20. From the foregoing, the present embodiment is also excellent in terms of mass productivity.

In the embodiment, the length L1 of a portion of the first part 31 in the direction of air passage, the portion belonging to the substrate portion 23, is preferably equal to or less than 50% the length L0 of the entire substrate portion 23 in the direction of air passage. If this is satisfied, during rotation of the recording medium 45 the length L of the portion that approaches the surface of the recording medium 45 (the portion of the first part 31 belonging to the substrate portion 23) out of the entire substrate portion 23 becomes equal to or less than the length of the portion that gets away from the surface of the recording medium 45 (the second part 32). This makes it possible to prevent a collision between the slider 20 and the recording medium 45 with yet higher reliability.

Figure 25:
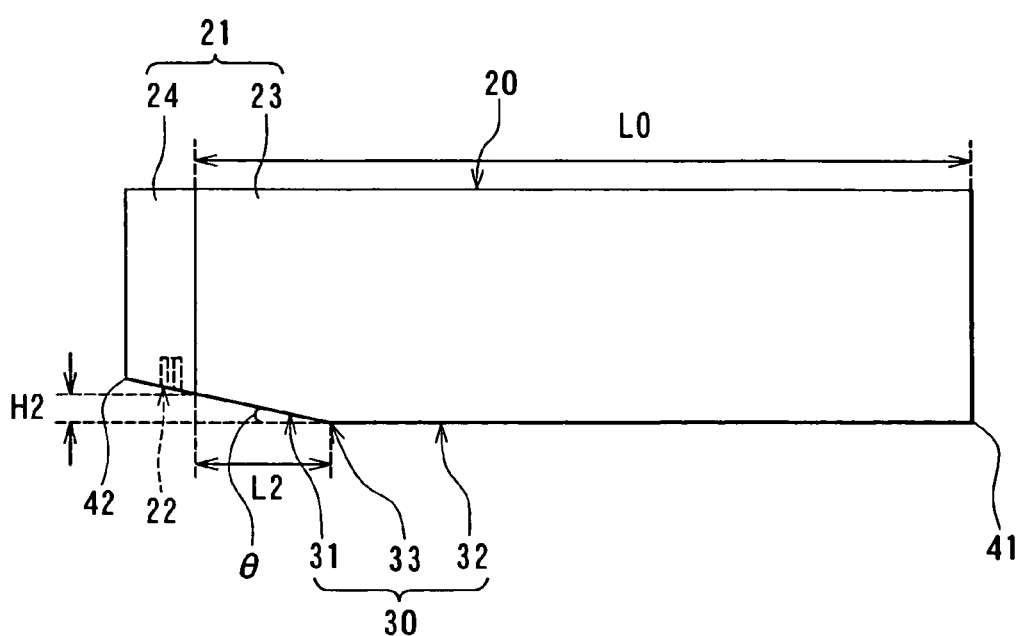
FIG. 25 is a side view showing another example of the shape of the slider according to the first embodiment of the invention.

In the slider 20 shown in FIG. 1, the first parts 31 of the air bearing surface 30 are parallel to the surface opposite to the air bearing surface 30 of the slider main body 21. The slider 20 of the embodiment, however, may be shaped as shown in FIG. 25. In the slider 20 shown in FIG. 25, the second parts 32 of the air bearing surface 30 are parallel to the surface opposite to the air bearing surface 30 of the slider main body 21. The first parts 31 are slanted against the second parts 32 so that the entire air bearing surface 30 has a convex shape bent at the border parts 33. A first part 31 and a second part 32 preferably form an angle θ of no greater than 30°. The length L2 of a portion of the first part 31 in the direction of air passage (the lateral direction in FIG. 1), the portion belonging to the substrate portion 23, is preferably equal to or less than 50% the length L0 of the entire substrate portion 23 in the direction of air passage. The remainder of the configuration of the slider 20 shown in FIG. 25 is the same as that of the slider 20 shown in FIG. 1.

In the slider 20 shown in FIG. 25, the distance between a virtual plane containing the first part 32 of the air bearing surface 30 and an end of the portion of the first part 31 belonging to the substrate portion 23, the end being closer to the air outflow end 42, will be referred to as a difference of elevation and represented by a symbol H2. This difference of elevation H2 is determined by the lengths L0, L2 and the angle θ. The following provides examples of the relationship among the length L2, the angle θ, and the difference of elevation H2 where the length L0 is 1.2 mm.

When the length L2 is 10 μm, angles θ of 0.5°, 1°, 10°, and 30° yield differences of elevation H2 of 0.09 μm, 0.18 μm, 1.76 μm, and 5.77 μm, respectively.

When the length L2 is 50 μm, angles θ of 0.5°, 1°, 10°, and 30° yield differences of elevation H2 of 0.44 μm, 0.87 μm, 8.82 μm, and 28.87 μm, respectively.

When the length L2 is 100 μm, angles θ of 0.5°, 1°, 10°, and 30° yield differences of elevation H2 of 0.87 μm, 1.75 μm, 17.63 μm, and 57.73 μm, respectively.

Figure 26:
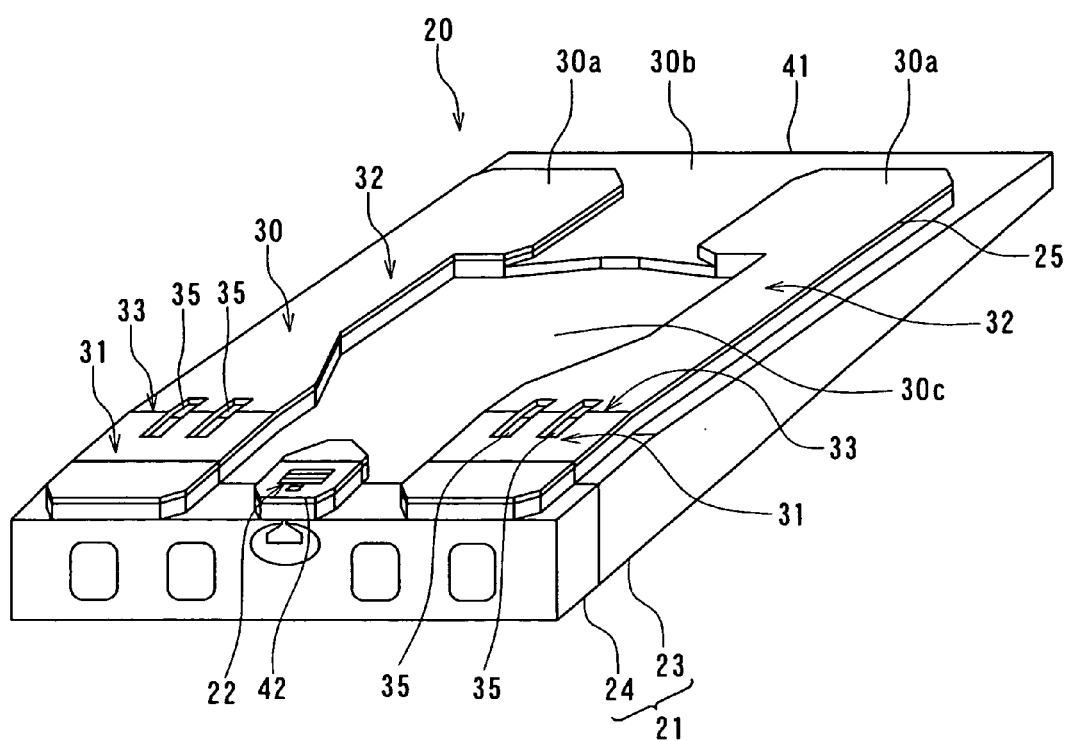
FIG. 26 is a perspective view showing an example of a configuration of a slider according to a second embodiment of the invention.
Figure 27:
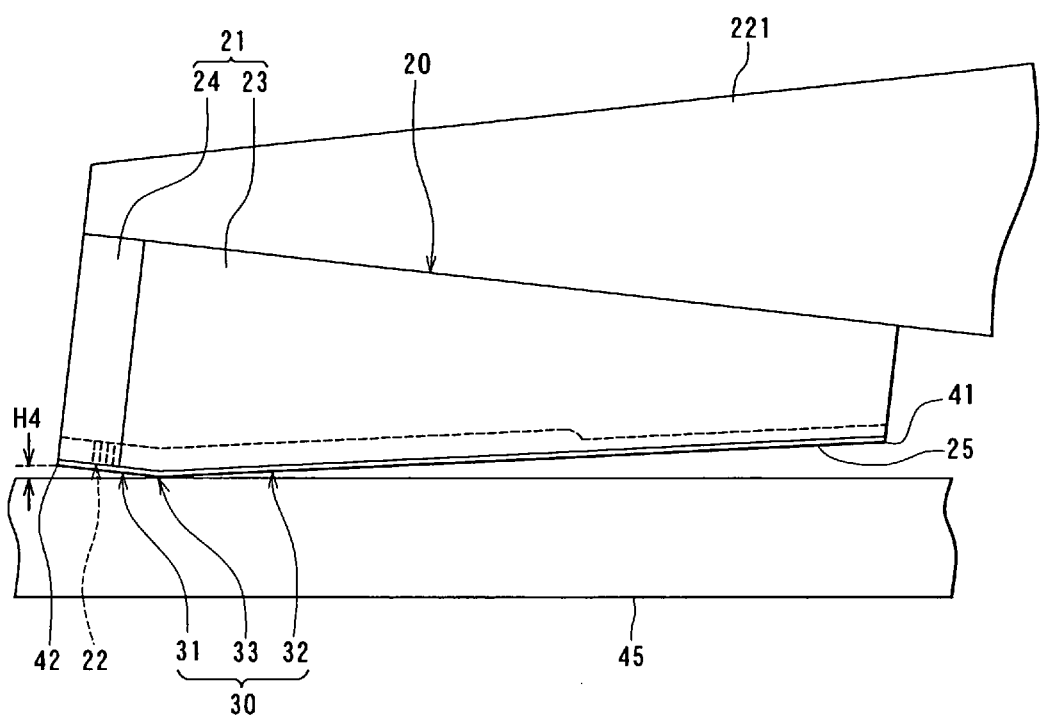
FIG. 27 is a side view showing a state of the slider shown in FIG. 26 when the recording medium is rotating and at rest.
Figure 28:
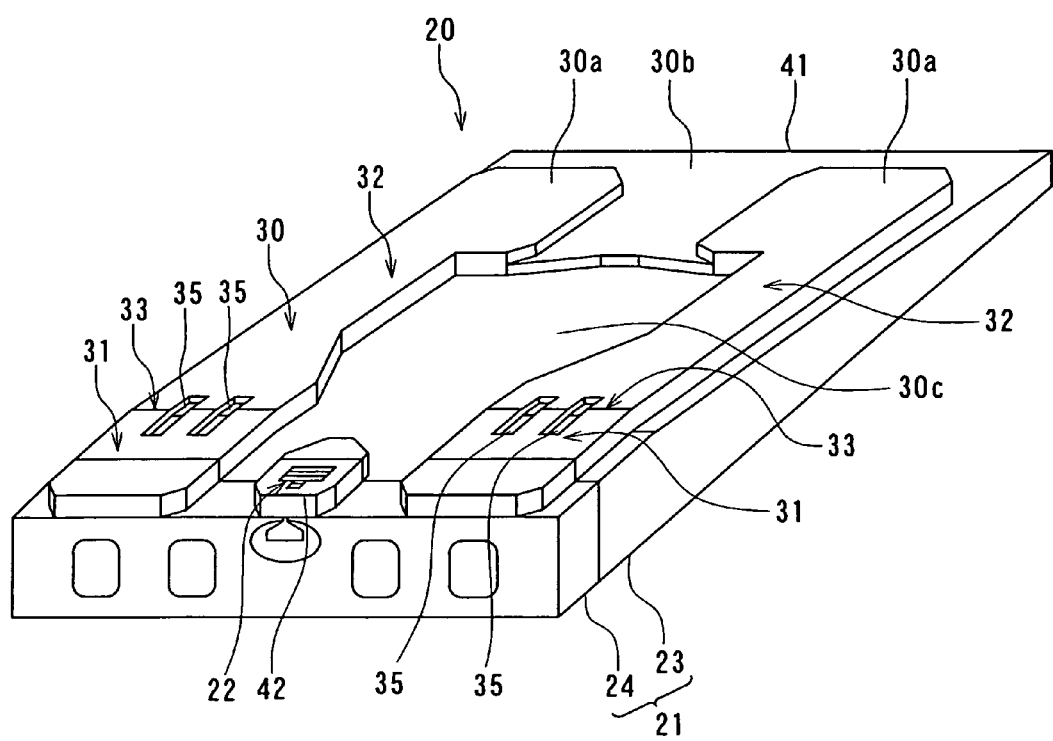
FIG. 28 is a perspective view showing another example of the configuration of the slider according to the second embodiment of the invention.

Reference is now made to FIG. 26 to FIG. 28 to describe a slider according to a second embodiment of the invention. FIG. 26 is a perspective view showing an example of a configuration of the slider according to this embodiment. According to the slider 20 of this embodiment, the slider main body 21 makes contact with the surface of the recording medium 45 at the border parts 33 of the air bearing surface 30 regardless of whether the recording medium 45 is rotating or at rest.

As shown in FIG. 26, in the slider 20 of the embodiment, the air bearing surface 30 has a plurality of recesses 35 formed in regions including the border parts 33. The remainder of the configuration of the slider 20 of the embodiment is the same as that of the first embodiment. According to the slider 20 of the embodiment, since the air bearing surface 30 has the recesses 35 formed in the regions including the border parts 33, it is possible to make the area in which the slider main body 21 contacts the surface of the recording medium 45 smaller than in the first embodiment.

142 The slider 20 shown in FIG. 26 has the protection layer 25. The recesses 35 are formed by etching the protection layer 25.

FIG. 28 shows the slider 20 of the embodiment in the case where the protection layer 25 is not provided. In this slider 20, the recesses 35 are formed by etching the substrate portion 23.

In the method of manufacturing the slider 20 of the embodiment, the step of forming the air bearing surface 30 includes the step of forming the recesses 35 mentioned above. According to the method of manufacturing the slider 20 in the case where the protection layer 25 is provided, the step of forming the recesses 35 is performed after the step of forming the protection layer 25. The recesses 35 are formed by etching the protection layer 25. According to the method of manufacturing the slider 20 in the case where the protection layer 25 is not provided, the step of forming the recesses 35 is performed after the step of forming the surfaces 30a to 30c. The recesses 35 are formed by etching the substrate portion 23. The other steps of the method of manufacturing the slider 20 are the same as those in the first embodiment.

Reference is now made to FIG. 27 to describe the functions and effects of the slider 20 according to the embodiment. FIG. 27 is a side view showing a state of the slider 20 when the recording medium 45 is rotating and when it is at rest. As shown in FIG. 27, in this embodiment the slider main body 21 of the slider 20 is in contact with the surface of the recording medium 45 at the border parts 33 of the air bearing surface 30 regardless of whether the recording medium 45 is rotating or at rest. The first and second parts 31 and 32 of the air bearing surface 30 are slanted against the surface of the recording medium 45 so that the air outflow end 42 and the air inflow end 41 are off the recording medium 45, respectively.

While the recording medium 45 is rotating, the distance H4 between the air outflow end 42 of the slider main body 21 and the surface of the recording medium 45 is about 5 nm.

The slider 20 of the embodiment allows a greater reduction in magnetic space as compared with the slider 20 of the first embodiment. Further, according to the embodiment, the slider main body 21 is always in contact with the surface of the recording medium 45. This can prevent occurrence of collision between the slider main body 21 and the recording medium 45 caused by the slider main body 21 coming into contact with and getting away from the surface of the recording medium 45.

According to the slider 20 of the embodiment, since the air bearing surface 30 has the recesses 35 formed in the regions including the border parts 33, the area in which the slider main body 21 contacts the surface of the recording medium 45 is smaller than in the first embodiment, and therefore the frictional resistance between the slider main body 21 and the surface of the recording medium 45 is reduced.

Since the slider 20 of the present embodiment allows a greater reduction in magnetic space as compared with the slider 20 of the first embodiment, it is possible to achieve a greater improvement in the reproducing output and a greater reduction in half width of the reproducing head, as well as greater improvements in the overwrite property and nonlinear transition shift of the recording head, as compared with the first embodiment. As a result, a greater improvement in the yield of the hard disk drives can be achieved.

In the slider 20 of the present embodiment, as in the first embodiment, the air bearing surface 30 has concavities and convexities formed by the surfaces 30a, 30b, and 30c which have differences in level. In the present embodiment, these concavities and convexities are used to control the orientation of the slider main body 21 while the recording medium 45 is rotating.

The remainder of the configuration, functions and effects of the present embodiment are the same as those of the first embodiment.

Figure 29:
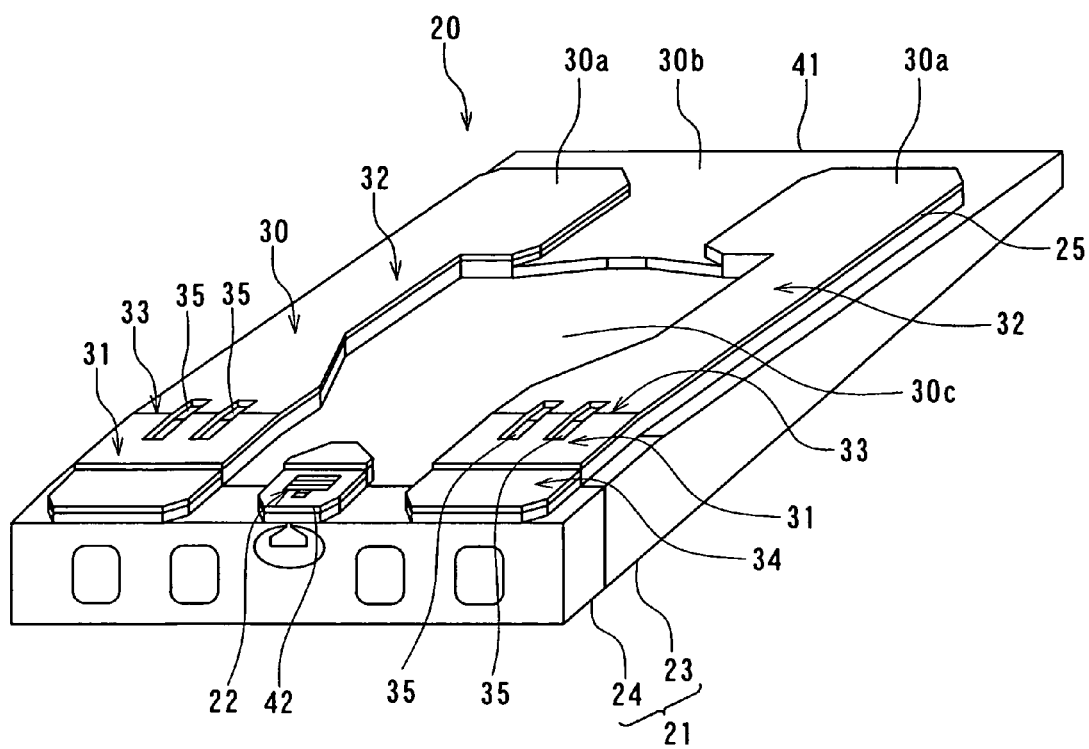
FIG. 29 is a perspective view of a slider according to a third embodiment of the invention.
Figure 30:
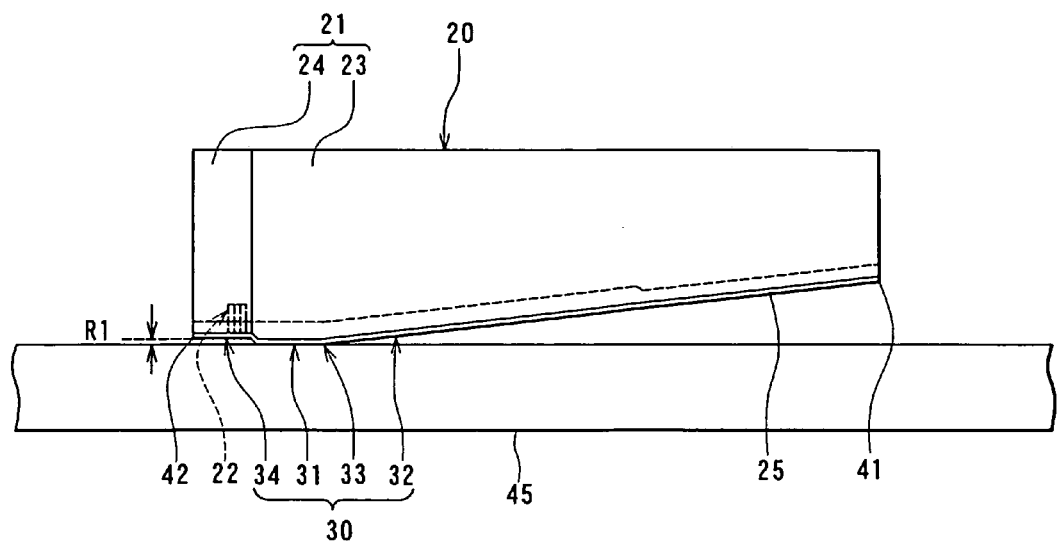
FIG. 30 is a side view showing a state of the slider shown in FIG. 29 when the recording medium is rotating.

Reference is made to FIG. 29 and FIG. 30 to describe a slider according to a third embodiment of the invention. FIG. 29 is a perspective view showing a configuration of the slider according to the embodiment. According to the slider 20 of the embodiment, the slider main body 21 is in contact with the surface of the recording medium 45 regardless of whether the recording medium 45 is rotating or at rest.

In the slider 20 of the embodiment, the first parts 31 of the air bearing surface 30 are formed on a surface of the substrate portion 23 that faces toward the recording medium 45. A surface 34 of the insulating portion 24 facing toward the recording medium 45 is located farther from the recording medium 45 than a part of the surface of the substrate portion 23 facing toward the recording medium 45 adjacent to the surface 34, that is, than the first part 31. The surface 34 constitutes part of the air bearing surface 30. The difference in level R1 between the surface 34 and the first part 31 is about 3 to 4 nm. This difference in level occurs in the step shown in FIG. 13, i.e., the step of forming the surface 31A including the first part 31 for the slider portion 50, because of a difference in hardness between the substrate portion 23 and the insulating portion 24. In the present embodiment, this difference in level is utilized to reduce the magnetic space. The remainder of the configuration of slider 20 of the present embodiment is the same as that of the second embodiment.

Reference is made to FIG. 30 to describe the functions and effects of the slider 20 according to the embodiment. FIG. 30 is a side view showing a state of the slider 20 when the recording medium 45 is rotating. As shown in FIG. 30, the slider 20 of the embodiment makes contact with the surface of the recording medium 45 at the first parts 31 and the border parts 33 of the air bearing surface 30 while the recording medium 45 is rotating. In this state, the distance between the surface of the recording medium 45 and the surface 34 of the insulating portion 24 facing toward the recording medium 45 is equal to R1, or on the order of 3 to 4 nm. Thus, according to the embodiment, the magnetic space can be reduced significantly.

According to the embodiment, the surface 34 of the insulating portion 24 facing toward the recording medium 45 makes no contact with the surface of recording medium 45. Therefore, the magnetic space can be reduced significantly as mentioned above while the thin-film magnetic head element 22 is kept away from the surface of the recording medium 45. As a result, it is possible to prevent damage to the thin-film magnetic head element 22 and the recording medium 45 caused by contact between the thin-film magnetic head element 22 and the recording medium 45.

When the recording medium 45 is at rest, the orientation of the slider 20 may be the same as that shown in FIG. 30, or that in FIG. 27 where the slider main body 21 is in contact with the surface of the recording medium 45 at the border parts 33 of the air bearing surface 30.

The slider 20 of the present embodiment allows a greater reduction in the magnetic space as compared with the sliders 20 of the first and second embodiments. Therefore, as compared with the first and second embodiments, the present embodiment provides a greater improvement in the reproducing output and a greater reduction in half width of the reproducing head, as well as greater improvements in the overwrite property and nonlinear transition shift of the recording head. As a result, a greater improvement in the yield of the hard disk drives can be achieved.

The remainder of the configuration, functions and effects of the present embodiment are the same as those of the second embodiment.

Figure 31:
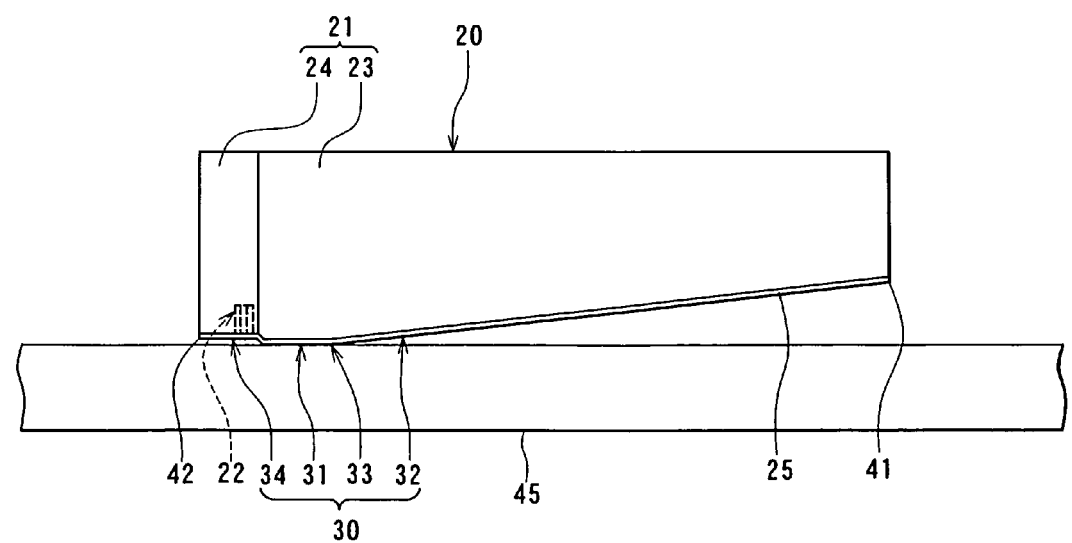
FIG. 31 is a side view showing a state of the slider according to a fourth embodiment of the invention when the recording medium is rotating.
Figure 32:
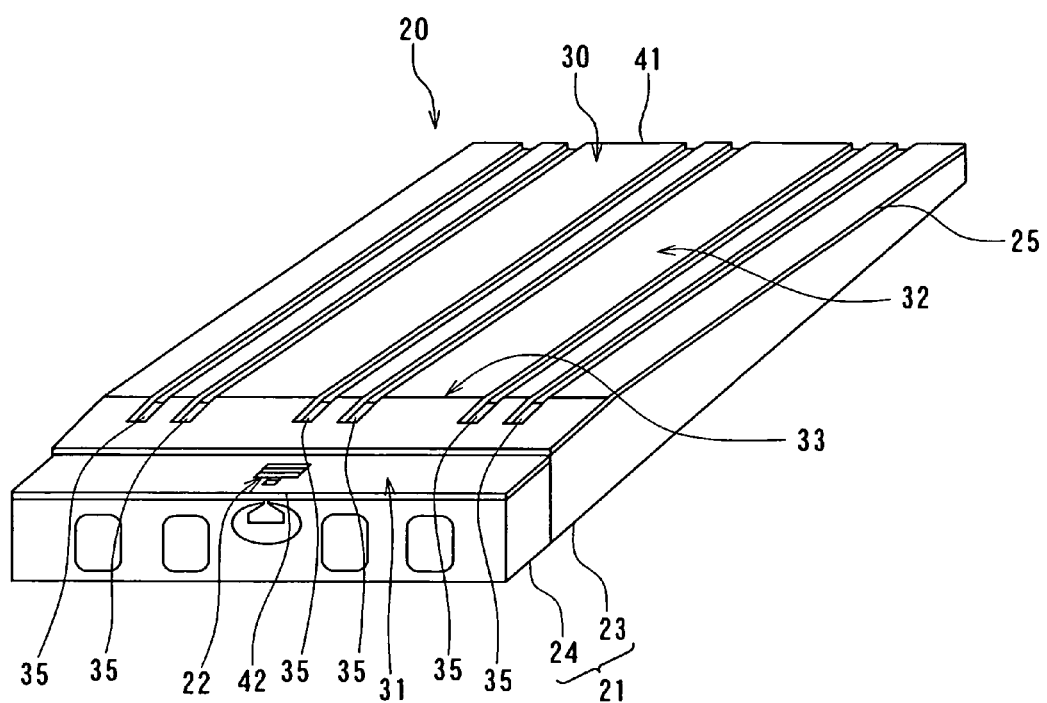
FIG. 32 is a perspective view showing an example of a configuration of the slider according to the fourth embodiment of the invention.
Figure 33:
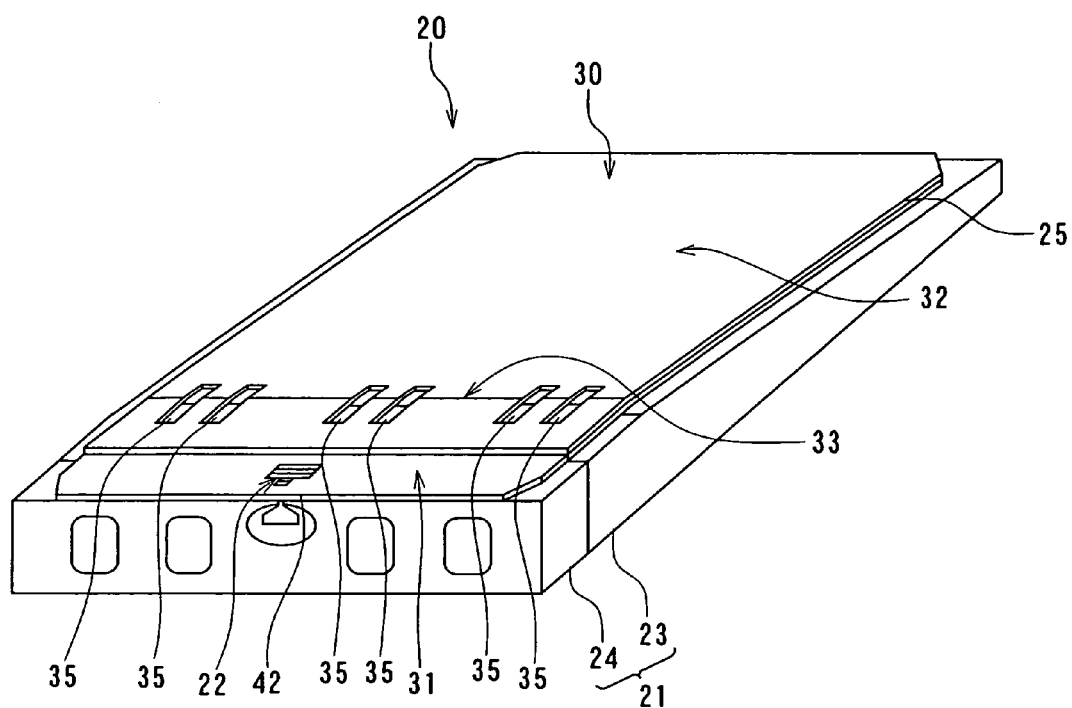
FIG. 33 is a perspective view showing another example of the configuration of the slider according to the fourth embodiment of the invention.
Figure 38:
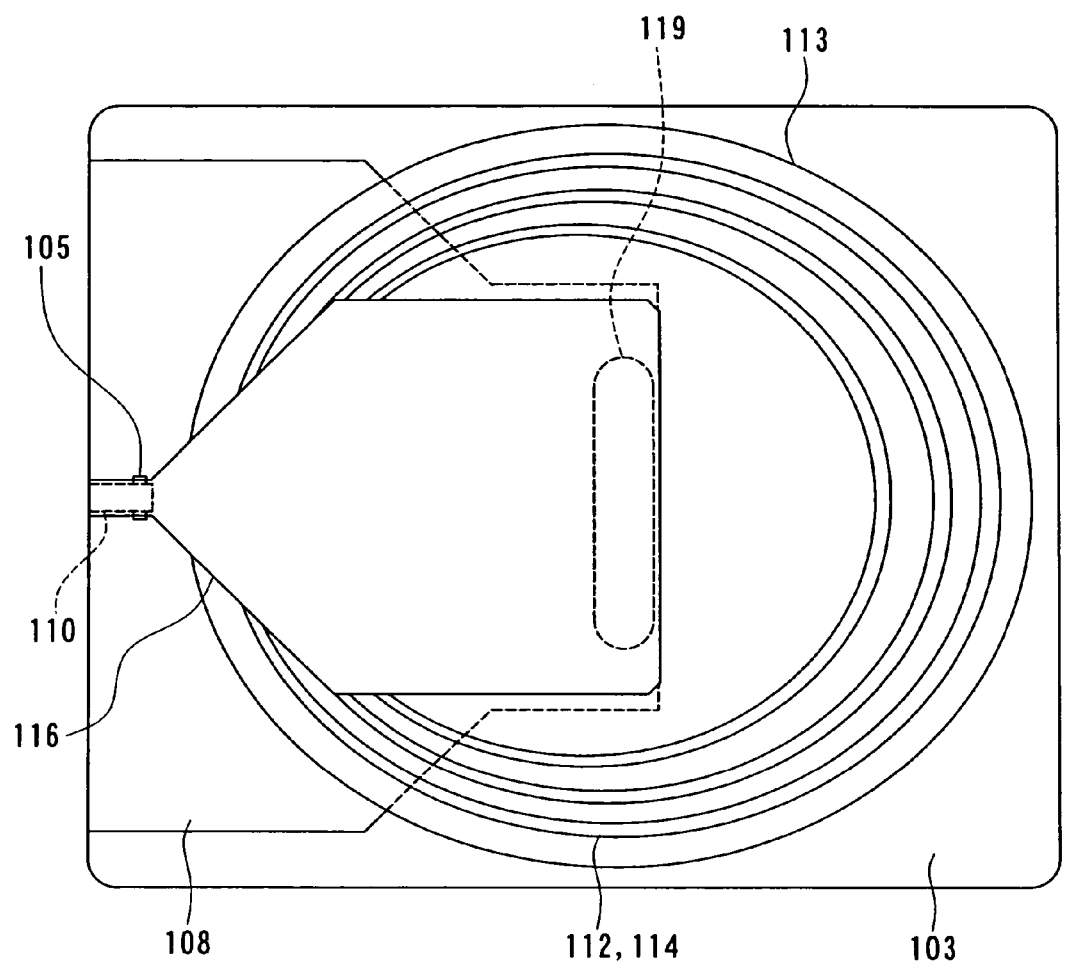
FIG. 38 is a top view of the related-art thin-film magnetic head element.
Figure 39:
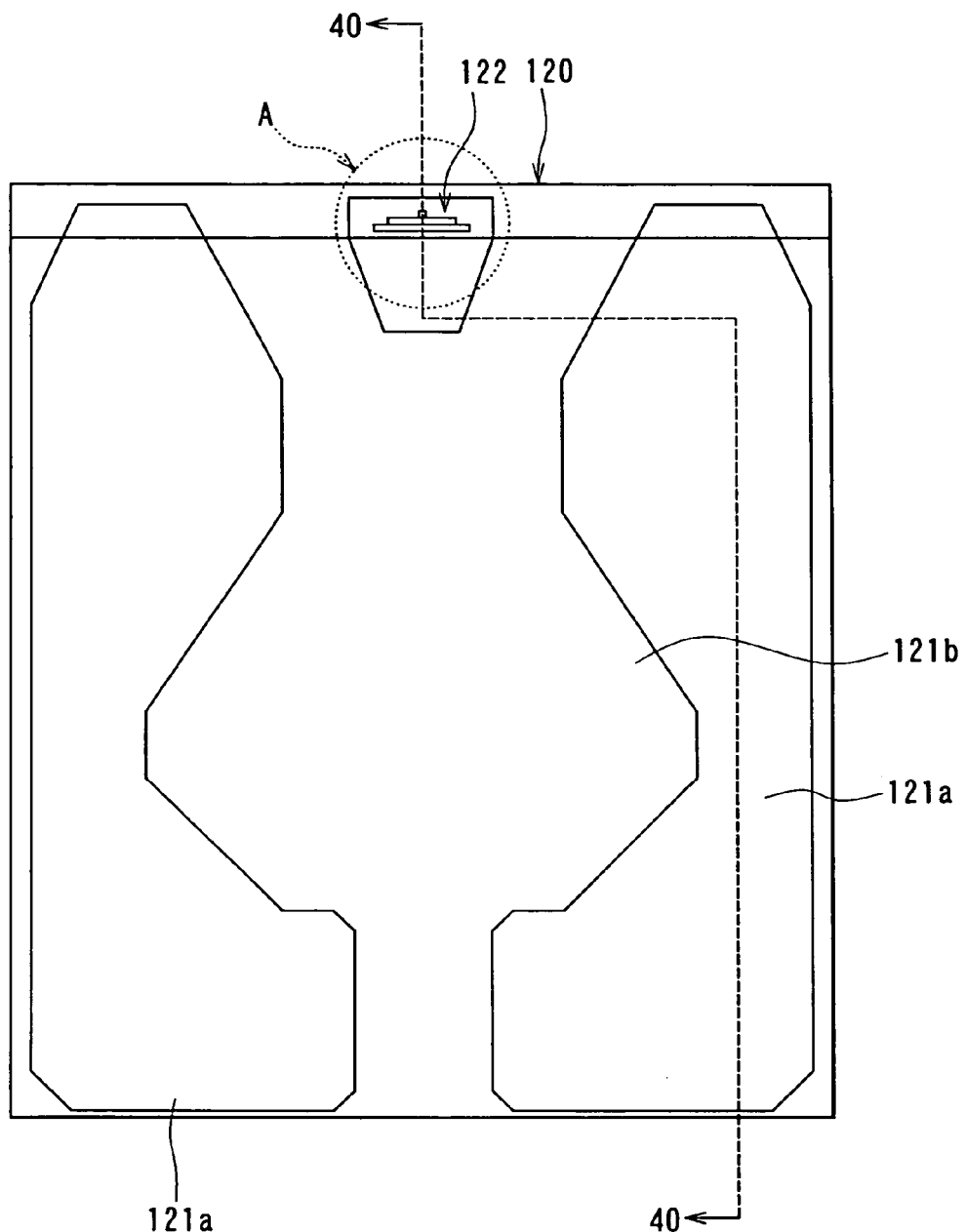
FIG. 39 is a bottom view illustrating an example of a configuration of the air bearing surface of a related-art slider.
Figure 40:
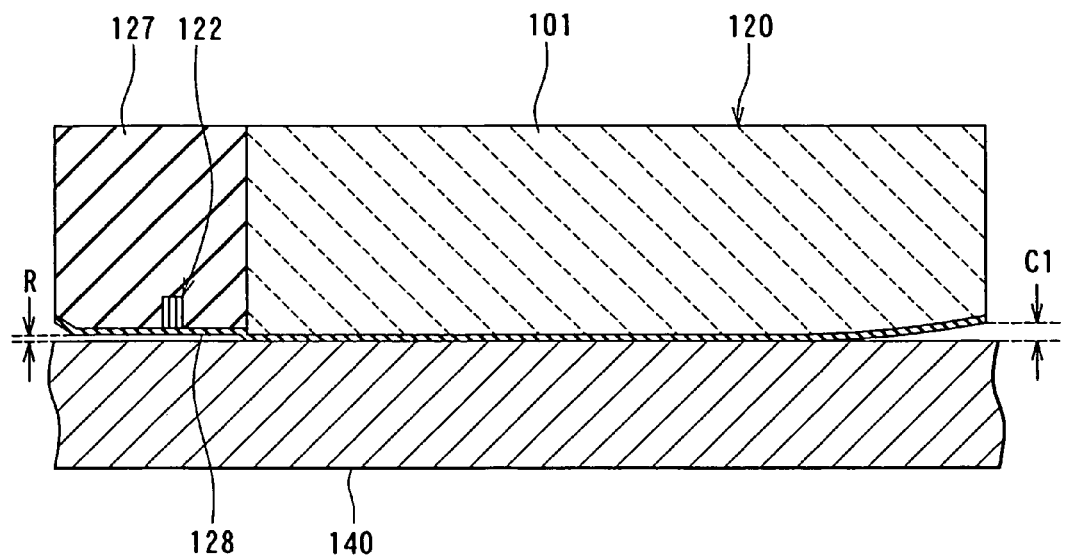
FIG. 40 is a cross section illustrating the related-art slider and a recording medium in a state in which the recording medium is at rest.
Figure 41:
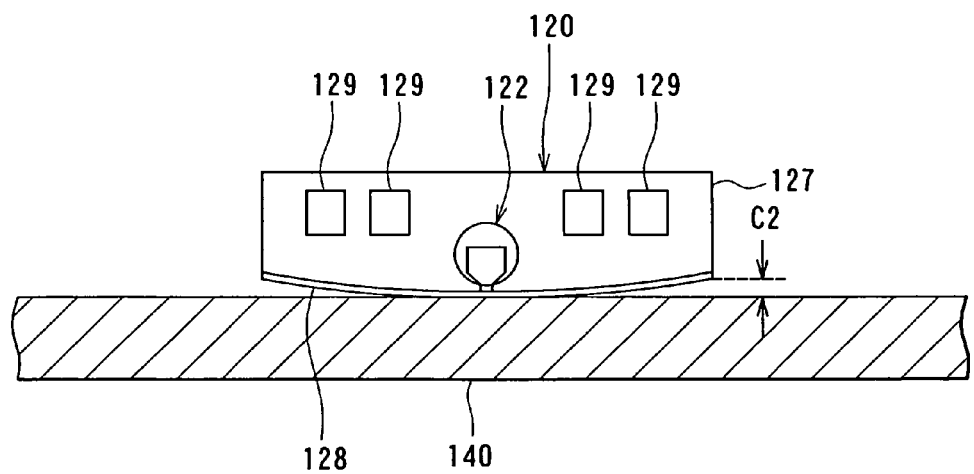
FIG. 41 is a front view showing the related-art slider of the related art as viewed from the upper side of FIG. 39.
Figure 42:
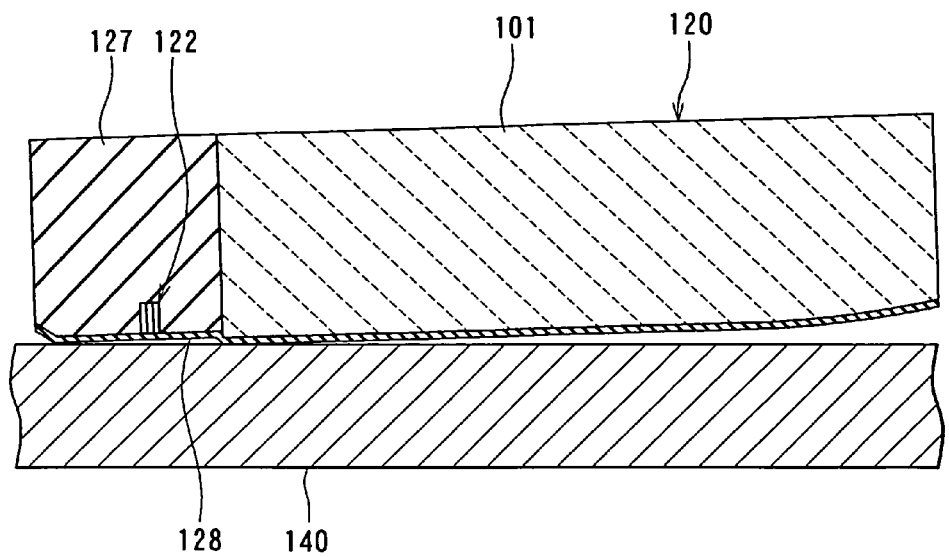
FIG. 42 is a cross section illustrating the related-art slider and the recording medium in a state in which the recording medium has just started rotation from a resting state.
Figure 43:
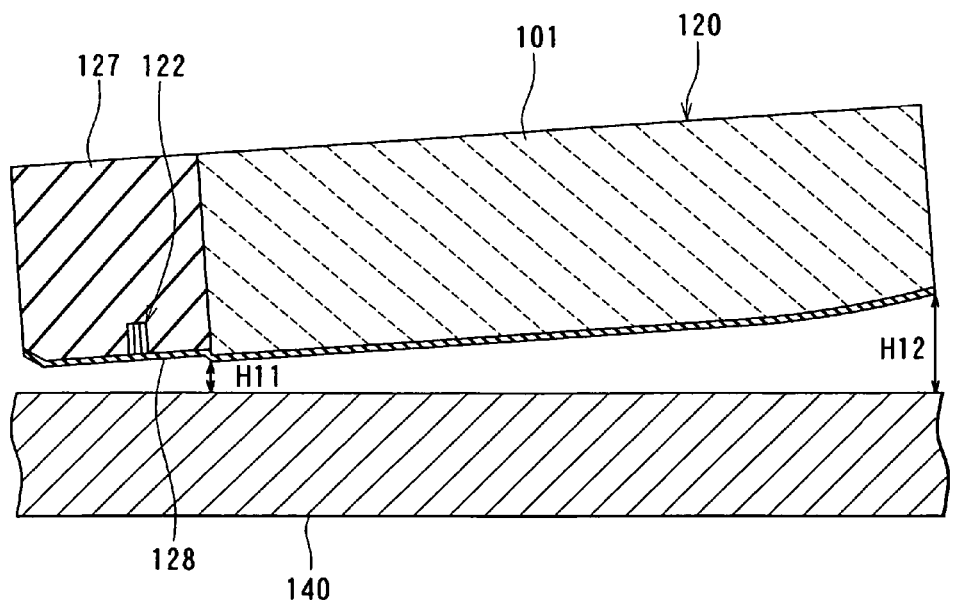
FIG. 43 is a cross section illustrating the related-art slider flying over the surface of the recording medium.

Reference is now made to FIG. 31 to FIG. 33 to describe a slider according to a fourth embodiment of the invention. FIG. 31 is a side view showing a state of the slider 20 when the recording medium 45 is rotating. FIG. 32 is a perspective view showing an example of the configuration of the slider according to this embodiment, and FIG. 33 is a perspective view showing another example of the configuration of the slider according to this embodiment.

In the slider 20 of the embodiment, as in the third embodiment, the slider main body 21 is in contact with the surface of the recording medium 45 regardless of whether the recording medium 45 is rotating or at rest.

In the slider 20 of the embodiment, the air bearing surface 30 has no concavity/convexity for controlling the orientation of the slider main body 21 during the rotation of the recording medium 45. The air bearing surface 30, however, has a plurality of recesses 35 formed in a region including the border part 33. FIG. 32 shows an example in which the recesses 35 are formed to reach the air inflow end 41. FIG. 33 shows an example in which the recesses 35 are formed only in the vicinity of the border part 33. In the example shown in FIG. 33, the edges of the slider main body 21 are chamfered on the periphery of the air bearing surface 30.

According to the slider 20 of the embodiment, the air bearing surface 30 has no concavity/convexity for controlling the orientation of the slider main body 21 during the rotation of the recording medium 45. Nevertheless, in the slider 20 of the embodiment, the slider main body 21 is in contact with the surface of the recording medium 45 regardless of whether the recording medium 45 is rotating or at rest. Therefore, even in the absence of the foregoing concavity/convexity, the orientation of the slider main body 21 can be kept constant while the recording medium 45 is rotating. Further, as shown in FIG. 33, by chamfering the edges of the slider main body 21 on the periphery of the air bearing surface 30, it is possible to prevent collision between the slider 20 and the recording medium 45 with yet higher reliability.

The remainder of the configuration, functions and effects of the present embodiment are the same as those of the third embodiment.

The present invention is not limited to the foregoing embodiments but may be practiced in still other ways. For example, the invention may be applied to a thin-film magnetic head dedicated to reading that has no induction-type electromagnetic transducer, a thin-film magnetic head dedicated to writing that has an induction-type electromagnetic transducer only, or a thin-film magnetic head that performs reading and writing with an induction-type electromagnetic transducer.

As has been described, in the slider of a thin-film magnetic head of the invention, the medium facing surface of the slider main body has a first part closer to the air outflow end, a second part closer to the air inflow end, and a border part between the first part and the second part. The second part is slanted against the first part so that the entire medium facing surface has a convex shape bent at the border part. In this slider, the entire medium facing surface has a convex shape bent at the border part, and, when the slider main body comes into contact with the surface of the recording medium, the border part makes the contact with the surface of the recording medium. Therefore, according to the invention, it is possible to reduce the magnetic space while preventing damage to the recording medium and the thin-film magnetic head element due to collision between the slider and the recording medium, and preventing the slider and the recording medium from sticking to each other.

In the slider of a thin-film magnetic head of the invention, while the recording medium is rotating, the second part may slant against the surface of the recording medium so that the air inflow end gets farther from the recording medium than the border part does. In this case, the thin-film magnetic head element approaches the surface of the recording medium. Therefore, in this case, during the rotation of the recording medium the thin-film magnetic head element can be placed close to the surface of the recording medium while the second part is kept farther from the recording medium than the thin-film magnetic head element is. As a result, it is possible to further reduce the magnetic space while preventing collision between the slider and the recording medium.

In the slider of a thin-film magnetic head of the invention, the slider main body may be in contact with the surface of the recording medium while the recording medium is at rest, and may stay away from the surface of the recording medium while the recording medium is rotating. When the slider main body comes into contact with the surface of the recording medium, the border part may be the first to make contact with the surface of the recording medium. In this case, the slider main body can smoothly come into contact with the surface of the recording medium, and as a result, it is possible to prevent damage to the recording medium and the thin-film magnetic head due to collision between the slider and the recording medium.

In the slider of a thin-film magnetic head of the invention, the slider main body may be in contact with the surface of the recording medium while the recording medium is at rest, and may stay away from the surface of the recording medium while the recording medium is rotating. When the slider main body takes off from the surface of the recording medium, the border part may be the last to depart from the surface of the recording medium. In this case, the slider main body can be separated smoothly from the surface of the recording medium, and as a result, it is possible to prevent damage to the recording medium and the thin-film magnetic head due to collision between the slider and the recording medium.

In the slider of a thin-film magnetic head of the invention, regardless of whether the recording medium is rotating or at rest, the slider main body may be in contact with the surface of the recording medium at the border part, and the first part and the second part may slant against the surface of the recording medium so that the air outflow end and the air inflow end are off the recording medium. In this case, it is possible to prevent occurrence of collision between the slider main body and the recording medium caused by the slider main body coming into contact with and getting away from the surface of the recording medium.

In the slider of a thin-film magnetic head of the invention, the medium facing surface may have a recess formed in a region including the border part. In this case, the area in which the slider main body contacts the surface of the recording medium can be made smaller, and as a result, it is possible to reduce frictional resistance between the slider main body and the surface of the recording medium.

In the slider of a thin-film magnetic head of the invention, the slider main body may include: a substrate portion that has a surface facing toward the recording medium and makes a base of the thin-film magnetic head element; and an insulating portion that has a surface facing toward the recording medium and surrounds the thin-film magnetic head element. The surface of the insulating portion facing toward the recording medium may be located farther from the recording medium than a part of the surface of the substrate portion facing toward the recording medium is, the part being adjacent to the surface of the insulating portion facing toward the recording medium. In this case, a significant reduction in magnetic space is achieved by putting a portion of the first part of the medium facing surface, the portion belonging to the substrate portion, into contact with the surface of the recording medium.

In the slider of a thin-film magnetic head of the invention, the length of a portion of the first part in the direction of air passage, the portion belonging to the substrate portion, may be equal to or less than 50% the length of the entire substrate portion in the direction of air passage. In this case, while the recording medium is rotating, the length of the part that approaches the surface of the recording medium out of the entire substrate portion becomes less than or equal to the length of the part that gets away from the surface of the recording medium. Therefore, it is possible to prevent collision between the slider and the recording medium with yet higher reliability.

In the slider of a thin-film magnetic head manufactured by the method according to the invention, the medium facing surface of the slider main body has a first part closer to the air outflow end, a second part closer to the air inflow end, and a border part between the first part and the second part. The second part is slanted against the first part so that the entire medium facing surface has a convex shape bent at the border part. In this slider, the entire medium facing surface has a convex shape bent at the border part, and, when the slider main body comes into contact with the surface of the recording medium, the border part makes the contact with the surface of the recording medium. Therefore, according to the method of manufacturing a slider of a thin-film magnetic head of the invention, it is possible to reduce the magnetic space while preventing damage to the recording medium and the thin-film magnetic head element due to collision between the slider and the recording medium, and preventing the slider and the recording medium from sticking to each other.

In the method of manufacturing a slider of a thin-film magnetic head of the invention, the step of processing the slider material may include the step of forming a recess in the medium facing surface at a region including the border part. In this case, the area in which the slider main body contacts the surface of the recording medium can be made smaller, and as a result, it is possible to reduce frictional resistance between the slider main body and the surface of the recording medium.

In the method of manufacturing a slider of a thin-film magnetic head of the invention, the portion to be the slider main body may include: a substrate portion that has a surface facing toward the recording medium and makes a base of the thin-film magnetic head element; and an insulating portion that has a surface facing toward the recording medium and surrounds the thin-film magnetic head element. The surface of the insulating portion facing toward the recording medium may be located farther from the recording medium than a part of the surface of the substrate portion facing toward the recording medium is, the part being adjacent to the surface of the insulating portion facing toward the recording medium. In this case, a significant reduction in magnetic space is achieved by putting a portion of the first part of the medium facing surface, the portion belonging to the substrate portion, into contact with the surface of the recording medium.

In the method of manufacturing a slider of a thin-film magnetic head of the invention, the length of a portion of the first part in the direction of air passage, the portion belonging to the substrate portion, may be equal to or less than 50% the length of the entire substrate portion in the direction of air passage. In this case, while the recording medium is rotating, the length of the part that approaches the surface of the recording medium out of the entire substrate portion becomes less than or equal to the length of the part that gets away from the surface of the recording medium. Therefore, it is possible to prevent collision between the slider and the recording medium with yet higher reliability.

Obviously many modifications and variations of the present invention are possible in the light of the above teachings. It is therefore to be understood that within the scope of the appended claims the invention may be practiced otherwise than as specifically described.

What is claimed is:

1. A method of manufacturing a slider of a thin-film magnetic head, the slider comprising: a slider main body having a medium facing surface that faces toward a rotating recording medium, an air inflow end, and an air outflow end; and a thin-film magnetic head element disposed near the air outflow end and near the medium facing surface of the slider main body, wherein the medium facing surface has: a first part closer to the air outflow end; a second part closer to the air inflow end; and a ridge line formed by intersection of the first part and the second part, the second part being slanted against the first part, the method comprising the steps of:
    forming a slider material containing a portion to be the slider main body and the thin-film magnetic head element, and
    processing the slider material so as to form the medium facing surface having the first part, the second part and the ridge line, and the air inflow end and the air outflow end on the slider material, wherein:
    the portion to be the slider main body includes:
        a substrate portion that has a surface facing toward the recording medium and makes a base of the thin-film magnetic head element; and
        an insulating portion that has a surface facing toward the recording medium and surrounds the thin-film magnetic head element; and
    the length of a portion of the first part in the direction of air passage, the portion belonging to the substrate portion, is equal to or less than 50% the length of the entire substrate portion in the direction of air passage.

2. A method of manufacturing a slider of a thin-film magnetic head according to claim 1, wherein the step of processing the slider material includes the steps of:
    lapping the slider material to form the first part; and
    lapping the slider material to form the second part.

3. A method of manufacturing a slider of a thin-film magnetic head according to claim 1, wherein the step of processing the slider material includes the step of forming, on the medium facing surface, a concavity/convexity for controlling orientation of the slider main body during the rotation of the recording medium.

4. A method of manufacturing a slider of a thin-film magnetic head according to claim 1, wherein the first part and the second part form an angle of no greater than 30°.

5. A method of manufacturing a slider of a thin-film magnetic head according to claim 1, wherein the step of processing the slider material includes the step of forming a recess in the medium facing surface at a region including the ridge line.

6. A method of manufacturing a slider of a thin-film magnetic head according to claim 1, wherein the step of processing the slider material includes the step of forming a recess in the medium facing surface at a region including the ridge line by etching the substrate portion.

7. A method of manufacturing a slider of a thin-film magnetic head according to claim 1, wherein the step of processing the slider material includes the step of forming a protection layer for covering the surfaces of the substrate portion and the insulating portion facing toward the recording medium.

8. A method of manufacturing a slider of a thin-film magnetic head according to claim 7, wherein the step of processing the slider material includes the step of forming a recess in the medium facing surface at a region including the ridge line by etching the protection layer.

9. A method of manufacturing a slider of a thin-film magnetic head according to claim 7, wherein the protection layer is made of alumina or diamond-like carbon.

10. A method of manufacturing a slider of a thin-film magnetic head according claim 1, wherein the surface of the insulating portion facing toward the recording medium is located farther from the recording medium than a part of the surface of the substrate portion facing toward the recording medium is, the part being adjacent to the surface of the insulating portion facing toward the recording medium.

* * * * *